(12) United States Patent
Brueske et al.

(10) Patent No.: US 7,466,256 B2
(45) Date of Patent: Dec. 16, 2008

(54) UNIVERSAL ULTRASOUND SIGMA-DELTA RECEIVER PATH

(75) Inventors: Daniel Edward Brueske, Sammamish, WA (US); D-L Donald Liu, Issaquah, WA (US); Steven Martin, Issaquah, WA (US); Brian Colby, Renton, WA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 11/731,568

(22) Filed: Mar. 30, 2007

(65) Prior Publication Data

US 2007/0236374 A1    Oct. 11, 2007

Related U.S. Application Data

(60) Provisional application No. 60/787,801, filed on Mar. 31, 2006, provisional application No. 60/793,055, filed on Apr. 19, 2006.

(51) Int. Cl.
*H03M 3/00* (2006.01)
(52) U.S. Cl. .............. 341/143; 600/447; 600/457; 600/443; 128/660.07; 128/661.01
(58) Field of Classification Search ......... 341/143–170; 600/439–449
See application file for complete search history.

(56) References Cited

U.S. PATENT DOCUMENTS

| | | | |
|---|---|---|---|
| 4,857,928 A | 8/1989 | Gailus et al. | |
| 5,203,335 A | 4/1993 | Noujaim et al. | |
| 5,555,534 A * | 9/1996 | Maslak et al. | 367/135 |
| 5,568,446 A | 10/1996 | Engeler et al. | |
| 5,825,318 A | 10/1998 | Patapoutain et al. | |
| 5,964,708 A * | 10/1999 | Freeman et al. | 600/447 |
| 6,110,116 A | 8/2000 | Wright et al. | |
| 6,135,961 A | 10/2000 | Pflugrath et al. | |
| 6,154,161 A * | 11/2000 | Leme et al. | 341/143 |
| 6,208,189 B1 * | 3/2001 | Freeman et al. | 327/277 |

(Continued)

FOREIGN PATENT DOCUMENTS

EP     0 411 473 A2    2/1991

(Continued)

OTHER PUBLICATIONS

Freeman, et al., Delta-Sigma Oversampled Ultrasound Beamformer with Dynamic Delays, IEEE Trans. on Ultrasonics, Ferroelectronics, and Frequency Control, vol. 46, No. 2, Mar. 1999.

(Continued)

*Primary Examiner*—Lam T Mai

(57) ABSTRACT

Ultrasound information for B-mode and CW Doppler mode use the same digital beamformer. Due to sigma-delta conversion or over sampling, sufficient dynamic range is provided for the desired bandwidth. By mixing the input ultrasound information to base band before conversion, additional dynamic range may be provided. The electrical impedance may be better matched to elements by connecting a different number of sigma-delta converters to an element. Elements with lower impedance may be connected to a plurality of sigma-delta converters. To increase the aperture size for elements with a higher impedance, the same sigma-delta converters may be used as separate receive beamformer channels without the summation.

22 Claims, 15 Drawing Sheets

U.S. PATENT DOCUMENTS

| | | | |
|---|---|---|---|
| 6,364,836 B1 * | 4/2002 | Fukukita et al. | 600/443 |
| 6,366,227 B1 | 4/2002 | Rigby | |
| 6,373,418 B1 * | 4/2002 | Abbey | 341/143 |
| 6,373,523 B1 | 4/2002 | Jang | |
| 6,423,006 B1 * | 7/2002 | Banjanin | 600/453 |
| 6,475,148 B1 * | 11/2002 | Jackson et al. | 600/439 |
| 6,602,194 B2 * | 8/2003 | Roundhill et al. | 600/443 |
| 6,690,748 B2 * | 2/2004 | Martin | 375/324 |
| 6,785,529 B2 * | 8/2004 | Ciccarelli et al. | 455/324 |
| 6,867,720 B1 | 3/2005 | Freeman et al. | |
| 6,895,123 B2 | 5/2005 | Li et al. | |
| 6,943,715 B2 | 9/2005 | Radja et al. | |
| 6,992,606 B2 * | 1/2006 | Zogakis et al. | 341/131 |
| 2003/0105399 A1 | 6/2003 | Morsy | |
| 2003/0231125 A1 | 12/2003 | Freeman et al. | |
| 2004/0189499 A1 | 9/2004 | Han et al. | |
| 2005/0068221 A1 | 3/2005 | Freeman et al. | |
| 2005/0117663 A1 * | 6/2005 | Drogi et al. | 375/316 |
| 2007/0229336 A1 | 10/2007 | Brueske et al. | |

FOREIGN PATENT DOCUMENTS

| | | |
|---|---|---|
| WO | WO 00/10638 A | 3/2000 |
| WO | WO 2004/030222 A1 | 4/2004 |

OTHER PUBLICATIONS

Freeman S. R., et al.: "An Ultrasound Beamformer Using Oversampling" Ultrasonics Symposium, 1997. Preceedings., 1997 IEEE Toronto, Ont., Canada Oct. 5-8, 1997, IEEE, US, vol. 2, Oct. 5, 1997, pp. 1687-1690, XP010271621, ISBN: 0-7803-4153-8.
International Search Report, mailing date Dec. 4, 2007.
PCT International Search Report, mailing date Jul. 1, 2008.

* cited by examiner

US 7,466,256 B2

UNIVERSAL ULTRASOUND SIGMA-DELTA RECEIVER PATH

RELATED APPLICATIONS

The present patent document claims the benefit of the filing date under 35 U.S.C. §119(e) of Provisional U.S. Patent Application Ser. Nos. 60/787,801, filed Mar. 31, 2006, and 60/793,055, filed Apr. 19, 2006, which are hereby incorporated by reference.

BACKGROUND

The present embodiments relate to receivers for sigma-delta beamforming for medical diagnostic ultrasound. In particular, the receiver includes a sigma-delta analog-to-digital converter for digital receive beamforming with different modes and/or different transducers.

Current ultrasound machines typically have a digital beamformer for B-mode, and possibly Pulsed-Wave (PW), and color flow Doppler modes. Nyquist sampling, multi-bit analog-to-digital converters (ADC) are typically used in this case. Since the data is typically not sampled at high enough frequencies for beamforming, data is estimated between samples using interpolation filters. Usually interpolation filters in digital beamformers have a high gate count because of the large coefficients and multipliers within the filter. Dynamic power dissipation is thus high because of the gate count. For continuous wave (CW) mode operation, a separate analog beamformer is provided for high dynamic range operation. Providing multiple beamformers for different modes increases system complexity and thus cost and physical space requirements increase.

Expanding applications to enhance workflow into portable hand-held ultrasound imaging devices require receiver architectures with significantly reduced power and costs while maintaining performance. Beamformers may be reduced in size or scaled. Small process geometries reduce the parasitic capacitances, which in turn reduces the power. However, scaling may only help incrementally through Nyquist converters such as flash or pipeline structures, because the ADCs may be susceptible to dynamic range limitations caused by process scaling. Thus, limited changes in power may be provided by scaling. As the profit margins in conventional ultrasound machines decrease, new receiver architectures are needed to reduce costs to maintain and/or increase profitability.

The connection from the transducer to the ultrasound system is also expensive. The cost of probe cable is often a significant proportion of the entire probe. Reducing the cable cost contributes to a big reduction in overall ownership costs, particularly for portable systems. Conventional analog cables (co-ax cables) are bulky as well. The bulkiness of the cable makes the probe hard to maneuver and contributes to repetitive muscle fatigue and injury.

A further complication is the use of different transducers with the same imaging system. Different transducers have different sized elements, such as a one-dimensional array having larger elements than a two-dimensional array. The differences in electrical impedance due to the different element sizes may limit the dynamic range of the receiver.

BRIEF SUMMARY

By way of introduction, the preferred embodiments described below include methods, systems, receivers, and receive beamformers for ultrasound information. Two different features may be used independently or together. First, ultrasound information for different modes, including B-mode, Pulsed-Wave (PW) Doppler, color flow Doppler and Continuous Wave (CW) Doppler mode, use the same digital beamformer. Due to sigma-delta conversion or oversampling, sufficient dynamic range is provided for the desired bandwidth. By mixing the input ultrasound information to base band before conversion, additional dynamic range may be provided.

Second, the electrical impedance may be better matched to elements by connecting a different number of sigma-delta converters to an element. Larger elements with lower impedance may be connected to a plurality of sigma-delta converters. The dynamic range is maintained by summing the digital outputs from the same element prior to beamforming. To support numerous smaller elements with higher impedance, the same sigma-delta converters may be used as separate receive beamformer channels without the summation.

In a first aspect, an improvement is provided for a receive beamformer system for ultrasound information. A first receive beamformer channel has a sigma-delta analog-to-digital converter. The first receive beamformer channel is operable for both continuous wave Doppler and pulsed B-mode signals.

In a second aspect, a method is provided for receive beamforming ultrasound information. Continuous wave Doppler and B-mode ultrasound signals are received in a first channel. The continuous wave Doppler and B-mode ultrasound signals are converted in the first channel from analog-to-digital by oversampling. The converted continuous wave Doppler and B-mode ultrasound signals are beamformed.

In a third aspect, a receiver system is provided for ultrasound information. A first summer is operable to combine the ultrasound information from a plurality of sigma-delta analog-to-digital converters. Conductors are operable to bypass the first summer with the ultrasound information from the sigma-delta analog-to-digital converters. Switches are operable to select between the first summer and the conductors as a function of element impedance.

In a fourth aspect, a method is provided for receiving ultrasound information from different sized transducer elements. A plurality of sigma-delta analog-to-digital conversion paths is provided. The paths are used separately as receive beamformer channels for connection with first elements. The ultrasound information from multiple ones of the paths are summed as a receive beamformer channel for connection with second elements. The second elements have lower impedance than the first elements.

The present invention is defined by the following claims, and nothing in this section should be taken as a limitation on those claims. Further aspects and advantages of the invention are discussed below in conjunction with the preferred embodiments and may be later claimed in combinations or independently.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Figure 1:
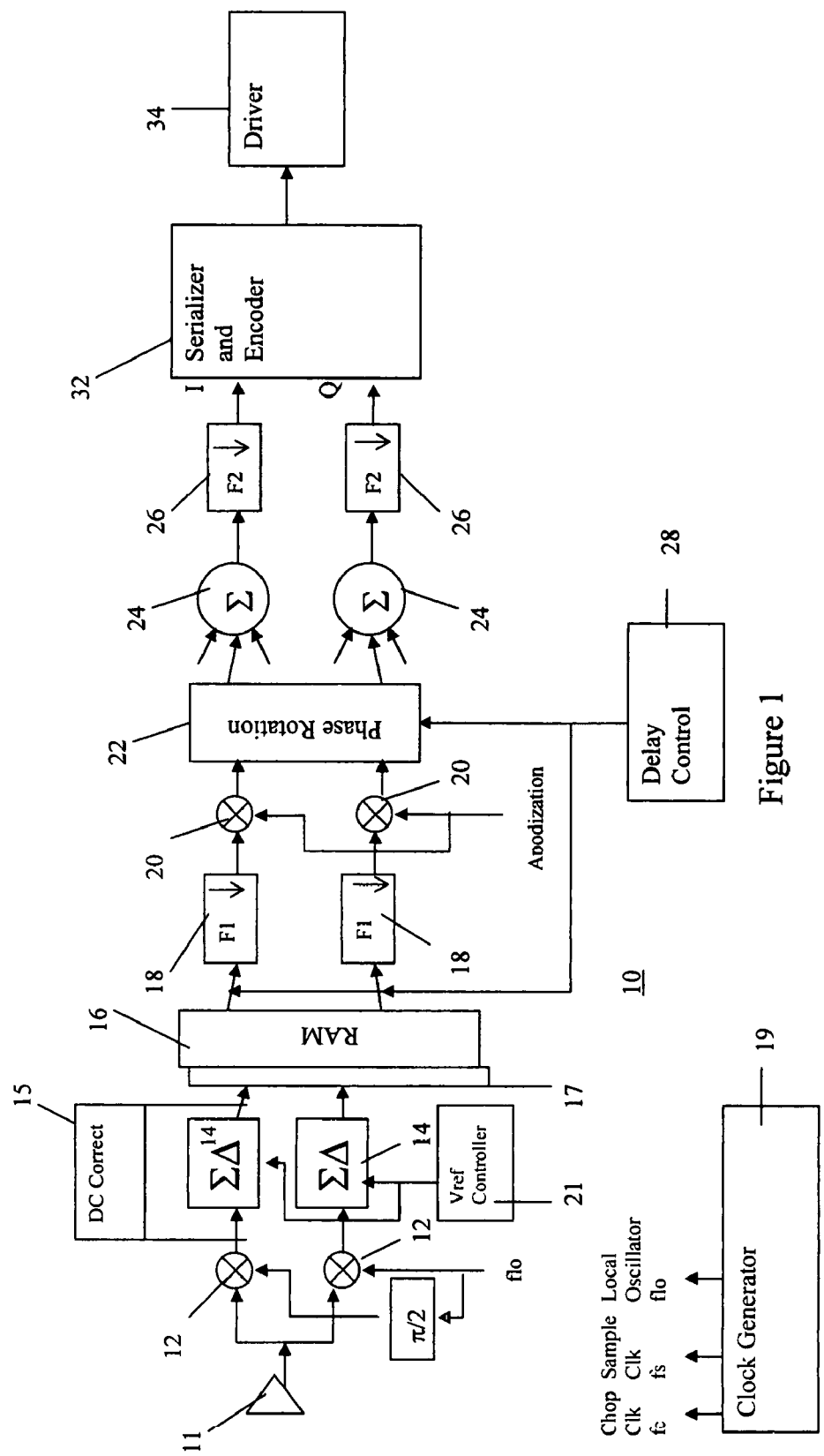
FIG. 1 is a block diagram of one embodiment of a base band receive beamformer system.

The same receive beamformer may be used for different ultrasound modes, including B-mode and CW Doppler mode. Signals may be interfaced between the transducer handle and imaging circuits digitally, reducing or eliminating cables. As a result, the cable is more ergonomically friendly. Wireless communications may be used as well. A transducer digital interface enables replacement of the ultrasound system 'box' into a digital processing machine (e.g., computer) which may be a commodity to further reduce development and machine costs.

The same receiver may be used with multiple or different sized elements and corresponding transducers. Sigma-delta paths may be switched between operation as separate receive channels or grouped into receive channels. The grouping may allow operation with desired dynamic range even with lower impedance elements. For grouping, fewer total receive channels may be available. Partial or full beamforming may also be provided. For separate operation, more total receive channels may be available. Partial or full beamforming may be provided. The same circuit may operate with different types of transducers.

These different embodiments (multi-mode and multi-transducer) are used separately or in a same embodiment. In both types of embodiments, a sigma-delta converter ($\Sigma\Delta$) is used. The $\Sigma\Delta$ provides one of the highest figures of merit (FOM). FOM relates to an ADCs dynamic range, power, and bandwidth. In addition, $\Sigma\Delta$ is a relatively simple architecture and uses little die area. In addition, $\Sigma\Delta$ are less susceptible to process scaling issues because typically only a one bit quantizer is needed within the oversampling converter. By using $\Sigma\Delta$, the low noise amplifier (LNA) may be the only active analog component. Separate variable gain amplifier (VGA) and anti-aliasing filter blocks may be avoided since continuous time $\Sigma\Delta$ does not require any pre-filtering due to the large oversampling ratio and "analog" nature. The TGC function is integrated by using a variable gain $\Sigma\Delta$ and a gain control circuit that varies the reference voltage for the $\Sigma\Delta$ as a function of time to provide TGC.

Base band processing may provide greater dynamic range for a given signal BW and minimize power consumption. A multiplying digital-to-analog converter (MDAC) may down convert the signal to base band. The MDAC allows a multi-level local oscillator (LO) waveform to be generated, which allows optimization of the harmonics. Flicker or 1/f transistor noise can be an issue especially with low geometry MOSFET devices. Typically, this noise dominates within one megahertz of a device's output noise spectral density. A chopper clock is used within the $\Sigma\Delta$'s integrators to up-convert this noise outside the band of interest. The noise is then removed by the proceeding filters within the beamformer. The integrators are chopped at a rate, which minimizes signals from aliasing in band after sampling at the quantizer. Nominally, the chopping rate is at half the $\Sigma\Delta$'s sampling rate.

A DC correction loop around the $\Sigma\Delta$ may be used to remove DC offset that occur at the input to the $\Sigma\Delta$, limiting process related variation in performance. The offsets within the $\Sigma\Delta$ are removed by the choppers described previously. The DC correction loop is a mixed signal loop with digital at the input and analog at the output. The loop has a large time constant and could be made to update between receive cycles. In addition, the offset could be removed on a power on cycle and then held constant via memory control of a DAC.

Another advantage of the $\Sigma\Delta$ is single bit processing. Single bit comb FIR filters positioned after the $\Sigma\Delta$ for reconstruction are simple to construct and have a minimal number of gates because no multipliers are needed with single bit processing. After the comb filter, the data becomes multi-bit, but at a decimated rate. The amount of bit processing remains relatively constant where the decimation rate and bit width at the output of the comb filter are usually equal. Non-equal rate and bit width may be used. The data is summed to form a beam, and then sent to a final decimation filter for reconstruction of samples at the Nyquist rate.

For different transducers, different combinations of $\Sigma\Delta$ paths may be used. The outputs of multiple $\Sigma\Delta$ paths may be summed as a single receive beamformer channel, preserving dynamic range for lower impedance elements. The outputs of the same multiple $\Sigma\Delta$ paths may be maintained separate as multiple receive channels for higher impedance elements. Multiple receive beamformer channels are used for beamforming or sub-array beamforming. Given a limited number of $\Sigma\Delta$ paths, different numbers of receive beamformer channels are formed as a function of the impedance and/or connections to elements. For example, sub-array beamforming is provided for a two-dimensional array, but complete beamforming is provided for a one-dimensional array using the same circuit at different times.

FIG. 1 shows a system 10 for receive beamforming ultrasound information. U.S. Published Application No. 20070229336, filed the same day as the current application, shows other embodiments, and is incorporated herein by reference. The system 10 is a receiver and receive beamformer system. The system 10 is positioned in a medical diagnostic ultrasound imaging system. For example, the receive beamformer is in a cart or portable imaging system and connects with a transducer through a cable or wires. In other embodiments, the receive beamformer or a portion of the receive beamformer is positioned in a transducer probe handle. Cables, wires, or a wireless connection provides data to the rest of the imaging system, such as a computer.

The system 10 includes a plurality of receive beamformer channels. Any number of channels may be provided, such as 32, 64, 128, 194, 256, 1024, or other number. Each channel corresponds to one or more elements. The channels separately apply relative focusing and apodization. The data from the channels is summed to form data representing a beam or sub-array beam. For each scan line or beam, a focusing and apodization profile is applied across the channels. The profiles may change as a function of time or depth for dynamic receive focusing.

The system 10 is implemented on one or more integrated circuits. For example, separate chips are provided for groups of channels, such as 16, 128, 256, 512, 1024, or other numbers of channels being implemented on a chip. Cascaded summers may be provided on the same chip, or the summer or summers and downstream components are on one or more different chips. Other circuit implementations may be provided, such as using sequential separation between chips, using a processor, or using a field programmable gate array.

FIG. 1 shows one of the receive beamformer channels through to a summer 24. The other channels have the same or different components. The channel includes a low noise amplifier 11, analog mixers 12, the oversampling analog-to-digital converters 14, a DC correction circuit 15, a time gain controller (TGC) 21 for the reference of the converters 14, a chopper clock generator 19 for the integrators, the delay memory 16, the reconstruction filters 18, the apodization multipliers 20, and phase rotator 22. Additional, different, or fewer components may be provided, such as also providing multiplexers and a clock. Focusing is provided in delay and phase rotation stages. In other embodiments, focusing is provided with only delay or only phase rotation stages. The apodization multipliers 20 may be positioned before the reconstruction filters 18 or after the phase rotator 22, or in combination with the phase rotator 22. The DC correction circuit 15 may not be provided. Different sigma-delta focusing arrangements may be used, such as bit repetition, zero insertion, or bit insertion.

The low noise amplifier 11 is a transistor or other analog amplifier. Low noise amplification raises the input signal above the noise floor of the sigma-delta converters 14 while minimizing the degradation in signal-to-noise ratio (SNR) (i.e., low noise figure). In one embodiment, the low noise amplifier has a single ended input and a differential output. The converters 14 are driven with a differential output to limit common mode signaling. Alternatively, a single ended output is provided.

In the case of large signals, the reference voltage of the sigma-delta converter 14 may be modified to accommodate the larger signals using Vref controller 21. The controller in the one embodiment adjusts the reference voltage without injecting noise which could interfere with the signal. The reference voltage may be used to implement a time gain control function. By keeping the gain of the low noise amplifier 11 to a minimum, the dynamic range of the receiver may be optimized. Distortion is kept to a minimal, and power necessary to amplify the signal is kept low. A typical gain range is 20-40 dB.

The analog mixers 12 are Gilbert cells, multiplying digital-to-analog converters (MDACs), or other mixers and a source of an oscillating signal or repetitive pattern, such as a crystal and phase locked loop. The received signals are mixed with the local oscillation signal. Two analog mixers 12 allow mixing with the local oscillating signal with 90-degree phase difference. The analog mixers 12 provide in-phase and quadrature (IQ) signals. The local oscillation signal is at a receive center frequency so the IQ signals are at a base band frequency for base band beamforming. Alternatively, the IQ signals are demodulated to an intermediate frequency band.

The IQ signals are low-pass signals, so the IQ signals may be converted by a conventional low-pass sigma-delta converter 14 as opposed to a band pass converter. Because of the reduced frequency bandwidth by demodulation to base band, a higher oversampling ratio may be used, and the resulting dynamic range is higher. Higher dynamic range may allow the same beamformer to operate for both B-mode imaging and PW or steered CW Doppler imaging. The sigma-delta converter 14 offers a trade-off between dynamic range and signal bandwidth that matches the requirements of ultrasound signal processing in various modes, such as B-mode and color flow mode. For example, with the $2^{nd}$ order sigma-delta converter, the dynamic range increases by 15 dB for every halving of signal bandwidth while keeping the sampling frequency the same. Mixing to base band improves the signal-to-noise ratio. The over sampling ratio (OSR) is a function of the signal bandwidth only and not the center frequency for signals at base band. If $f_o$ is the center frequency, $f_{lo}$, the local oscillator frequency, and $f_{max}$ half of the maximum signal freq bandwidth, the OSR is:

$$OSR = \frac{f_s}{2f_{bw}} = \frac{f_s}{2(f_o - f_{LO} + f_{max})}.$$

If $f_o = f_{lo}$, the equation becomes a function of $f_{max}$. In different modes, such as CW Doppler, an improvement in dynamic range is provided. The bandwidth for CW Doppler is small as compared to B-mode (e.g., 25 KHz verses 1 MHz). Since $f_{max}$ is greatly reduced for CW Doppler, the dynamic range is larger.

No analog low-pass filter may be needed after mixing to remove the second harmonic component because of the high sampling rate of the sigma-delta converter 14 and subsequent digital low-pass filtering. In alternative embodiments, a low pass filter is provided after mixing and before conversion.

Figure 2:
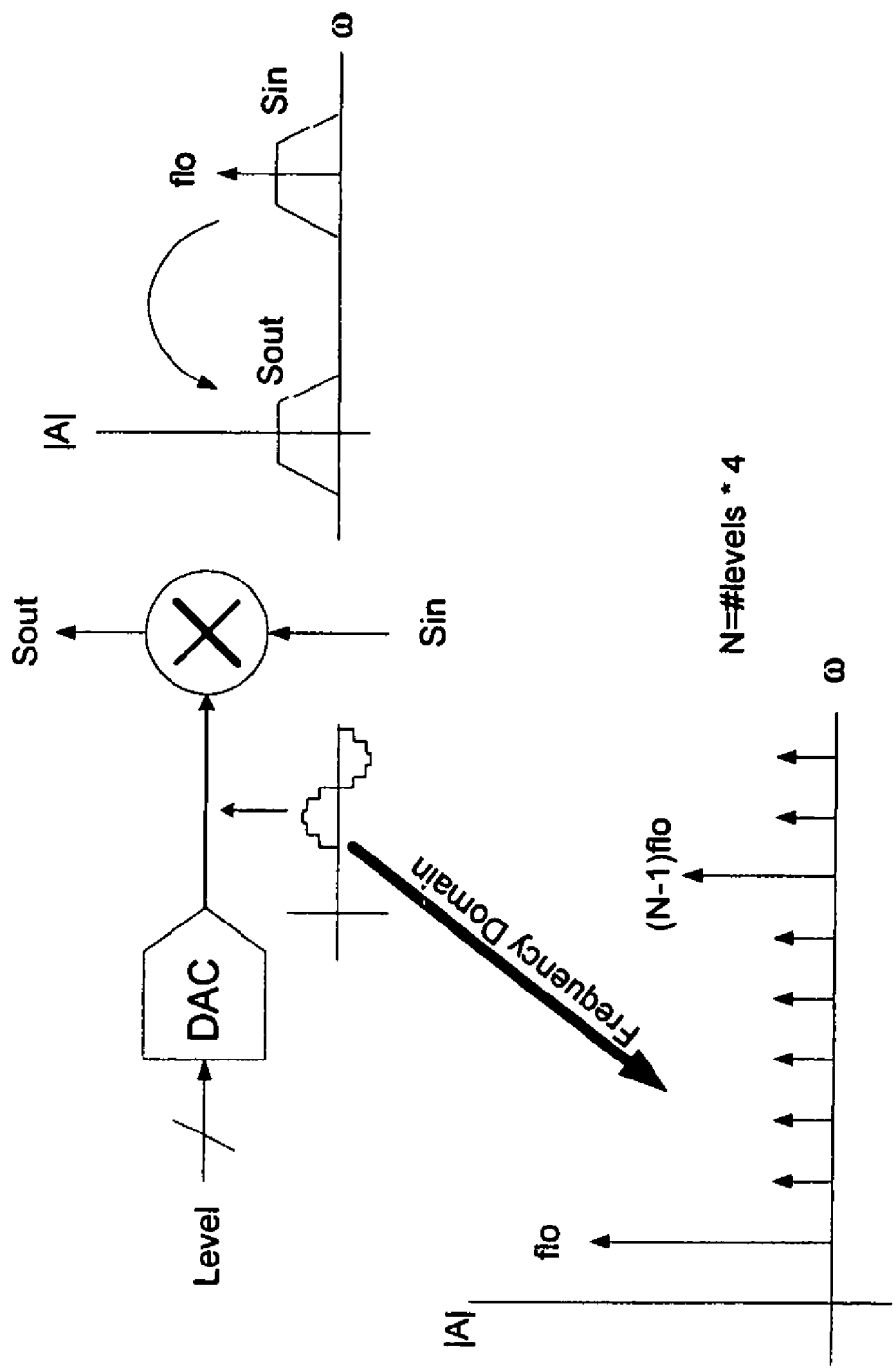
FIG. 2 shows one embodiment and associated digital input signals of a multiplying digital-to-analog converter used for mixing.

In one embodiment, the mixers 12 are multiplier digital-to-analog converters (MDAC). FIG. 2 shows one example implementation. The MDAC causes the input signal $S_{in}$ to be multiplied by a multi-level signal output by a digital-to-analog converter. The levels are typically implemented by using a ratio of devices such as capacitors or resistors. The levels are chosen to suppress desired harmonics, such as significant suppression of all but a few of the high frequency harmonics. One example output of the digital-to-analog converter is shown with a corresponding spectrum. Other level waveforms may be used. For example, a 2-level waveform corresponding to a square wave may be used for simplicity.

In an alternative embodiment, the beamformer system 10 operates at the signals center frequency. The analog mixers 12 are not provided. The resulting channel includes a single path instead of I and Q. This embodiment may use less hardware, but may have less dynamic range since band pass signals lead to a lower oversampling ratio.

The sigma-delta analog-to-digital converters 14 are operable to sample higher than the Nyquist rate (e.g., two or more times higher). In one embodiment, the converters 14 over sample by a ratio of at least 10. The sampling rate is much higher compared to the Nyquist rate. The Nyquist rate is based on the center frequency of the received signals, such as a center frequency of 1-20 MHz. The converter 14 outputs samples at a rate at least 10, such as 20-200, times the Nyquist rate.

The sampling bit width is low, such as one bit. Higher bit widths, such as two, four, or more, may be provided. The converters 14 shape quantization noise and filter to maximize in-band SNR based on the nature of the conversion.

The sigma-delta analog-to-digital converters 14 are first, second, or higher order converters. In one embodiment, a 1st order 480 MHz sampling converter is provided with single bit quantization. In another embodiment, a 2nd order 240 MHz sampling converter 14 is provided with single bit quantization. For example, a second order converter 14 with two integrators is provided for higher dynamic range. In a $2^{nd}$ order converter 14, there are two integrators in the feed forward path. The integrators are "analog" or "discrete" types. Analog integrators are used for continuous time sigma-delta converters 14, and switch capacitor integrators are used for sampled sigma-delta converters 14. A continuous time or a hybrid integrator converts the incoming signals. Any high frequency noise coming from the receiver is filtered to prevent aliasing in band. The continuous time sigma-delta converters 14 acts as an anti-aliasing filter.

Since base band signals are being sampled in the embodiment of FIG. 1, the converters 14 are low-pass converters. Other oversampling converters may be used. Two converters 14 are provided in each receive channel, one for each of the IQ signals. High dynamic range is achieved by using low-bit-width, high sampling rate, and noise shaping by which the noise energy is pushed away in spectrum from the signal bandwidth.

The dynamic range of the samples is determined by the following equation:

$$DR = \frac{3}{2}\left(\frac{2L+1}{\pi^{2L}}\right)(2^N - 1)^2 R^{2L+1}.$$

The second order sigma-delta converter 14 has roughly a 15 dB change in dynamic range for every doubling of the oversampling ratio. By oversampling, the same digital beamformer channels may be used for multi-mode operations, such as B-mode and CW Doppler signals. Using the same beamformer and beamformer channels for these different modes is an improvement and reduces complexity and costs.

The bandwidth of the converters 14 automatically or inherently scales with dynamic range, allowing operation of the beamformer with different modes while providing the desired dynamic range. In one embodiment, the converters and/or beamformer operates the same no matter the mode. In other embodiments, one or more parameters are varied as a function of the mode. For example, the bias levels of the converters 14 may be varied to provide lower noise levels for CW operation as compared to B-mode operation. As another example, the filter characteristics of the one or more reconstruction filters 18, 26 are varied as a function of mode. Since the modes may be associated with different bandwidths, different cut-off frequencies may be used. The sampling rates of the converters 14 may be altered as a function of mode.

Figure 4:
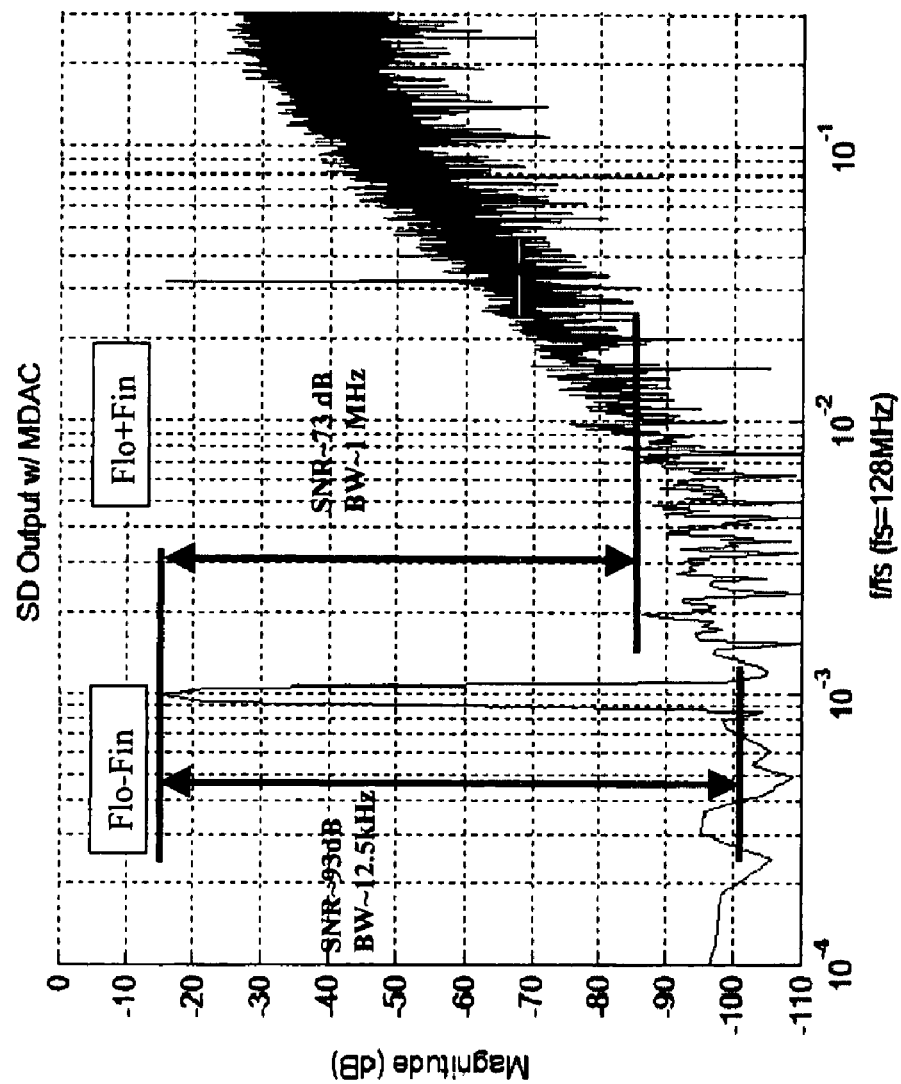
FIG. 4 is a graphical representation of a sampling frequency normalized spectrum of signals output by the circuit of FIG. 3.

FIG. 4 shows a sampling frequency normalized spectrum of an output of the sigma-delta converter 14 after mixing to base band by the mixer 12. A sinusoidal signal is used at the input to demonstrate the type of SNR achievable for a given bandwidth. Typically, Doppler modes have signal bandwidths which are <10% of the center frequency, while B-mode operation may be 100% or more. A plot of the Fourier transform of the output signal is shown in FIG. 4. For narrower band signals, such as 12.5 KHz CW Doppler signals, the SNR or dynamic range is about 93 dB. For wider band signals, such as 1 MHz B-mode signals, the SNR or dynamic range is about 73 dB. The SNR in this case is limited by the non-idealities of the circuitry, resulting in the max SNR of roughly 95 dB. This should be sufficient for CW Doppler and all other ultrasound modes. In general, the continuous wave Doppler signals have a bandwidth less than 50 KHz and the B-mode signals have a bandwidth greater than 50 KHz. The sigma-delta analog-to-digital converter 14 is operable at an oversampling ratio corresponding to a dynamic range of the continuous wave Doppler signals greater than 70 dB and a dynamic range of the B-mode signals greater than 60 dB.

The high frequency tone is from the mixing. This signal should be significantly attenuated after further filtering. The noise shaping at higher frequencies is removed by filtering, such as by the reconstruction filters 18, 26 or other filters, such as filters in the imaging system downstream from the beamformer. System side filters may be larger and/or longer filters where space and/or power are less of a consideration, providing more efficient removal of the high frequency tone.

Figure 3:
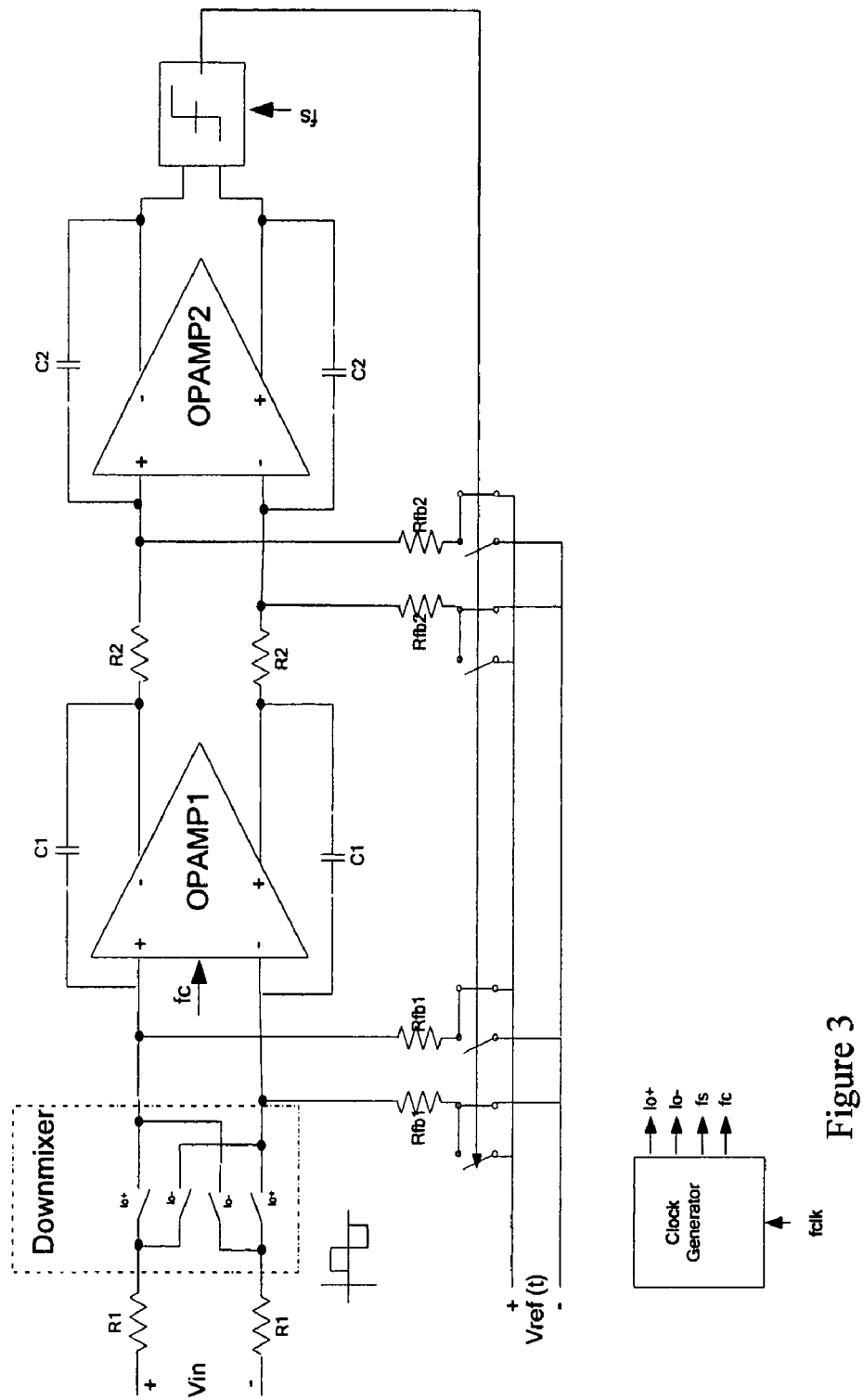
FIG. 3 is a circuit diagram of one embodiment of a mixer and sigma-delta converter.

The sigma-delta converters 14 typically have a high figure of merit (FOM) at a low cost and thus small die area usage. One example circuit embodiment of a differential version of the mixer 12 and sigma-delta converter 14 is shown in FIG. 3. The differential input voltage signal Vin is converted into a current by R1 and passed thru a simple 2-level mixer which converts the signal to base band. The output of the first integrator composed of opamp1 is the summation at the input of the down converted signal with the quantized feedback signal thru Rfb1. Only opamp1 has a fc clock associated with it. This is the chopper clock which removes 1/f noise and dc offsets out of the band of interest. This clock is not needed on the second opamp since its contribution is minimal (the first integrator overtakes any noise or offset contribution from the second integrator formed by R2, C2 and Opamp2). The second integrator output includes the summation at its input from feedback Rfb2. The single bit quantizer at the output of opamp2 quantizes the signal. The two integrators, quantizer and mixer make up the second order sigma delta converter with base band conversion.

In an alternative embodiment, the converter 14 is a band-pass converter. The band-pass converter 14 operates on radio frequency data. More dynamic range is provided by digital mixers 12 after the converters 14. The band-pass converter 14 may be tuned for use with specific types of transducers. The low pass converter 14 of FIG. 1 may more likely allow connection with transducers that operate at different frequencies.

Analog circuitry exhibits process variations manifested as DC offsets. These offsets may be handled with high pass filters, or analog cancellation. In another embodiment, the DC correction feedback circuit 15 is provided. The DC correction feedback circuit 15 connects from an output of the sigma-delta analog-to-digital converter 14 to an input of the sigma-delta analog-to-digital converter 14. The digitized signal at the output of the sigma-delta converter 14 is input in a feedback separate from the internal feedback of the sigma-delta converter 14. For simplicity, FIG. 1 shows only one DC correction feedback circuit 15. Another such circuit 15 is provided for the other converter 14.

Figure 6:
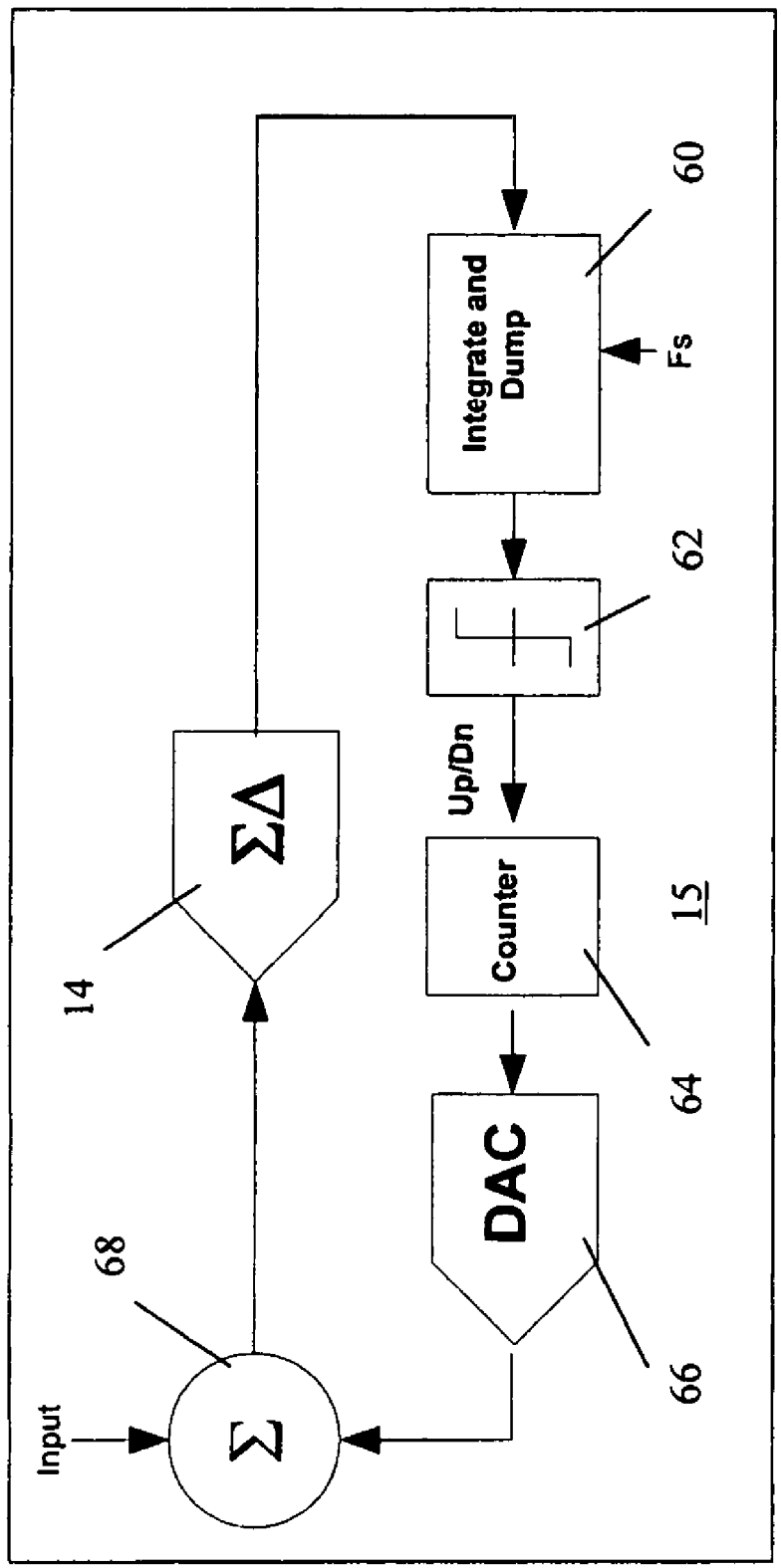
FIGS. 6 and 7 show different embodiments of a DC correction feedback.

FIG. 6 shows one embodiment of the DC correction loop 15. The DC correction loop 15 is formed by using an integrate and dump function 60 coupled with a counter 64 and a digital-to-analog converter 66. The threshold detector 62 makes a decision to count up or down based on the output of the integrate and dump. The integrate and dump function acts on the output of the sigma-delta converter 14. This output is sampled at every fs/M samples. M is the number of samples integrated between each dump. M is typically large, such as in the 100s of cycles. A decision is then made to increment or decrement the digital-to-analog converter 66 based on the integrate and dump output. The decision to count up or down is then made based on the integrated value as compared to a threshold. The counter 64 drives the digital-to-analog converter 66. In general, the range of the digital-to-analog converter 66 is less than the range of the input to the sigma-delta converter 14. It may be difficult to make a high dynamic range digital-to-analog converter without injecting noise into the signal, so a minimal amount of range is specified for the digital-to-analog converter to meet DC offset requirements. The analog output is summed with the input to the sigma-delta converter 14 by a summer 68.

This loop circuit 15 may also attenuate a clutter signal in Doppler mode. The speed requirements and range might be different then that needed for DC offsets, so a separate but similar loop is provided in other embodiments for clutter signal removal. The loop circuit 15 may provide 20 dB or so attenuation to the clutter, which should be near the DC signal in the frequency domain. Alternatively, a wall filter is provided within the path after beamforming.

The digital implementation in the loop circuit 15 allows the system more control over the operation. For example, the DC correction value output to the input of the sigma-delta analog-to-digital converter 14 via the summer 68 is held constant and updated between receive cycles. The loop may be off but held constant (i.e., the digital-to-analog converter acting as an analog memory). For example, during a 10 μs or so transmit event, the loop circuit 15 is deactivated to minimize transients. As the reference voltage varies for time gain control on receive, the deactivated loop circuit 15 provides the constant offset, avoiding undesired corrections. In another example, during receive events, the loop circuit 15 is open so as to minimize low frequency quantization noise injected thru the digital-to-analog converter 66. The DC loop circuit 15 creates a high pass response in the receiver path. Because the loop is digital, the corner of this response may be adjusted with the integrate and dump times. The loop may be digitally controlled.

Figure 7:
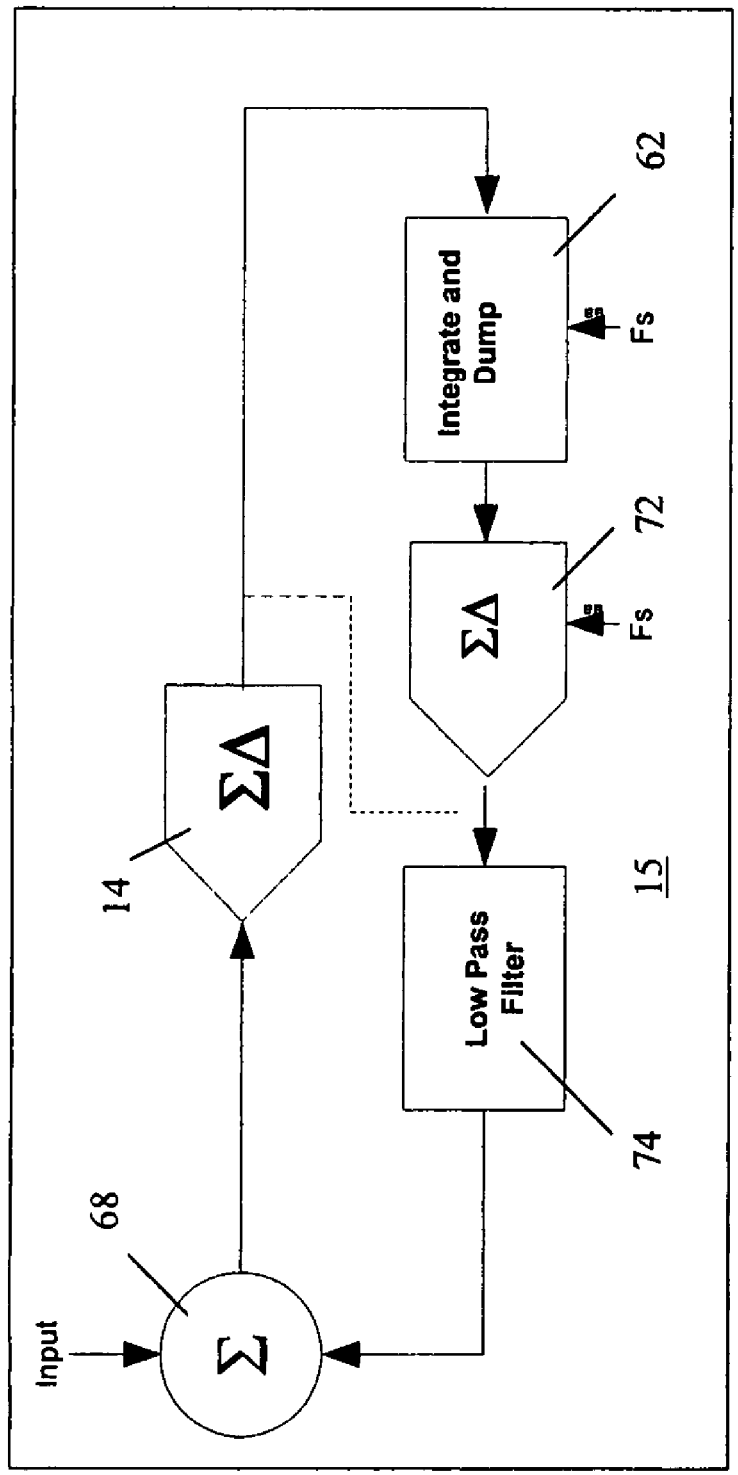

FIG. 7 shows another embodiment of the DC correction circuit 15. A sigma-delta digital-to-analog converter 72 is driven by the integrate and dump circuit 62. The output is filtered by a low pass filter 74. Alternatively, only the low pass filter 74 is used. Other DC correction circuits may be used.

Figure 5:
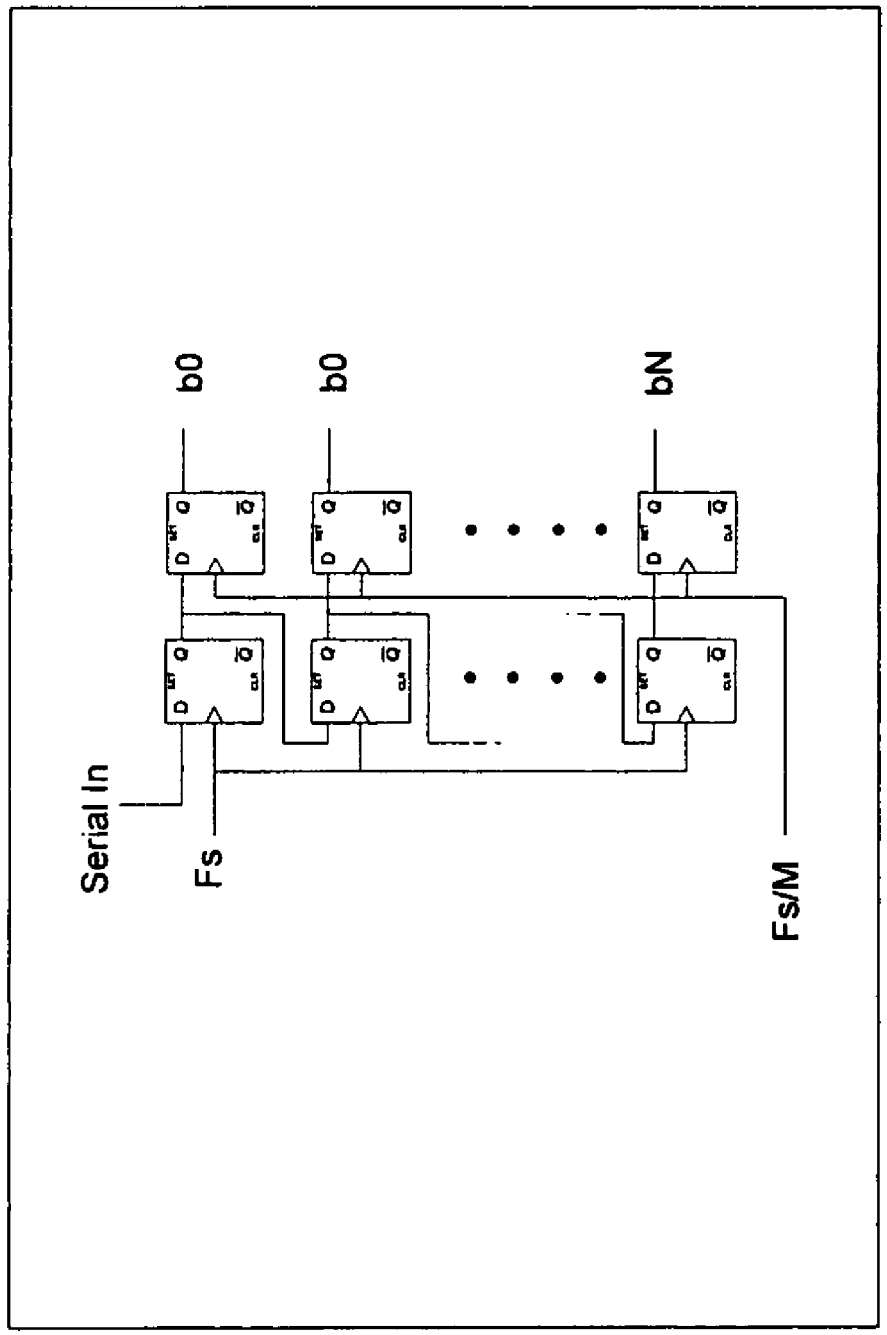
FIG. 5 is a circuit diagram of one embodiment of a serial-to-parallel converter.

A serial-to-parallel converter 17 connects between the memory 16 and the sigma-delta converters 14. The data out of the converters 14 may be sampled around 120 Msps or other rate. If the delay memory 16 has one or two ports, the serial data is converted to a parallel form to interface to the memory 16. In alternative embodiments, the memory 16 accepts the serial data. FIG. 5 shows one example embodiment of a serial-to-parallel converter 17. The number of flip-flops is equal to the number of output bits or parallelization factor.

Once the data has been converted to a parallel form by the serial-to-parallel converter 17, the data is transferred to the memory 16. Referring again to FIG. 1, the memory 16 is a random access memory, buffer, shift register, or other memory. The memory 16 receives samples at the oversampling rate. The samples are stored.

The memory 16 is a single or multi-bit memory, and includes sufficient memory slots to provide the needed delay range for steering and focusing. The memory 16 is large enough to store samples associated with the largest delay. The memory 16 allows the data to be buffered so that delays may be performed before sub-array or complete beamforming. For a maximum delay equal to the length of the probe or aperture (worse case), the time may be about 0.2 mm*48=9.6 mm/1.5 mm/uS=6.4 uS worth of delay in one example. The memory size is about 6.4 uS*120 MSps=768 samples. For addded flexibility, the memory size is 1024=1K for both I and Q.

The memory 16 is operable to output different selections of samples. Based on the delay and window size, samples for a desired focus are selected from the memory for beamforming. The window size is based on the number of samples for use in partial reconstruction by the filter 18, such as 10 to 1000 samples. A sufficient number of samples associated with a given delay are selected to allow filtering by the filter 18.

The delay controller 28 is a processor, control processor, digital signal processor, application specific integrated circuit, field programmable gate array, analog circuit, digital circuit, look-up table, memory, or combinations thereof The controller 28 controls the output of the memory 16. The controller 28 selects stored data from the memory 16 as a function of a delay for the beam. The controller 28 may include a same or different component for selecting phase rotations associated with the samples for fine focusing with the phase rotator 22. The selected samples are output to the filter 18.

In one embodiment, a calculator based on a Bresenham type of algorithm determines the delay of the beam. Since the sigma-delta oversamples the data, the delays are achieved in a dynamic decimation process versus an interpolative method. If the overall sample stretching for dynamic receive focusing is less than 1/M, where M is the decimation factor of the sigma-delta output, the calculator is minimal in complexity. Only a two-level decision is needed at the decimation rate. The memory read-out location is incremented by M or M−1 samples. For example, with M=16, dynamic receive focusing with focus number=1 can be supported by this type of algorithm. Alternatively, an interpolative method may be used. In an interpolative process, a fractional delay decision is made with many levels. Thus, multiple decisions are made, which increases the circuit complexity.

The filter 18 is a reconstruction filter or other circuit operable as a decimation circuit. For example, a comb filter with multiple stop bands is used. The filter 18 may be a poly-phase filter operable to effectively interpolate an input signal to a higher time resolution than a sampling interval of the oversampling converter. The filter 18 is operable to dynamically decimate under control of the dynamic delay controller 28. The filter 18 is one order above the order of the converter 14, but may have a same, lesser, or even higher order relative to the converter 14.

The filter 18 partially reconstructs the samples. The filter 18 reduces the incoming samples in rate, such as by decimation. Any decimation scale may be used, such as reducing the rate to a half, a quarter, an eighth or more. The filter 18 may increase the samples in bit width, such as by combination in filtering. Any increase in bit width may be used, such as changing from one bit to three, four, five, six, or more bit samples. For example, the filter 18 outputs signals oversampled less than output by the oversampling converters 14 and more than output by the second filter 26. The filter 18 outputs signals with a bit width greater than output by the oversampling converters 14 and less than output by the second filter 26. The beam sum is computed at a high rate but using only a single or few bits as compared to Nyquist sampling. To improve digitization accuracy or for other purposes, such as channel-wise decoding of coded-excitation, the filters 18 are cascaded with additional filters for each channel.

As a comb filter, the filter 18 has the following transfer function:

$$C(z) = \left( \frac{1 - z^{-M}}{1 - z^{-1}} \right)^K$$

where K is the filter order and M is the decimation rate. In spite of the IIR form of the transfer function, the filter is an FIR filter. The following table lists the filter parameters for K=3 (i.e., third order comb filter for use with second order sigma-delta modulation):

|  | M | | | | |
|---|---|---|---|---|---|
|  | 4 | 6 | 8 | 16 | M |
| # Taps | 10 | 16 | 22 | 46 | $K(M-1)+1$ |
| Tap bits | 4 | 5 | 6 | 8 | $\pm M^K$ |
| Max Output | ±64 | ±216 | ±512 | ±4096 | $\pm M^K$ |
| Output bits | 7 | 9 | 10 | 13 | $K\log_2 M + 1$ |

The comb filter pr events or limits quantization noise from out-of-band getting in-band from aliasing after decimation. By applying the comb filter decimation at non-uniform intervals, dynamic receive beamforming artifacts may be reduced.

Figure 8:
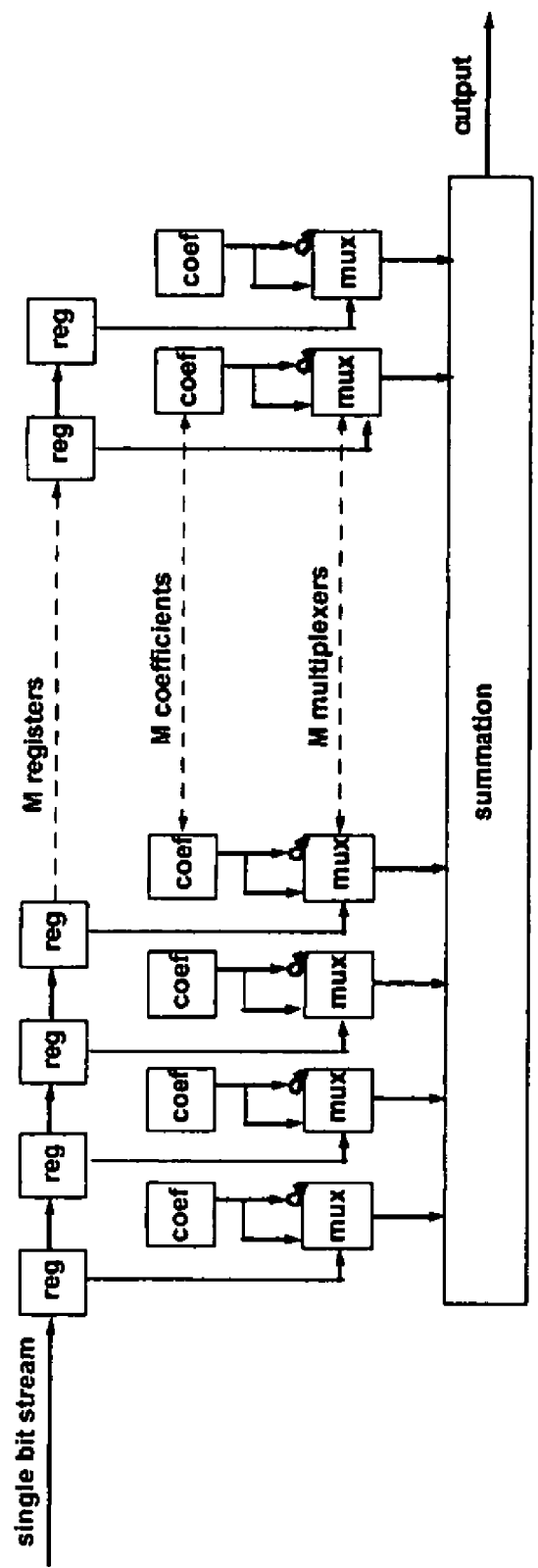
FIG. 8-11 show circuit diagrams of a comb filter according to different embodiments.

FIG. 8 shows one embodiment of the comb or decimation filter. For this implementation, a single decimation rate is chosen for cost and power efficiency. The filter 18 is centered about the data point selected by the delay calculator. Coefficients are N-bits (depends on decimation rate), signed, and may be programmed through the processor port. Because of the single bit data, only adders are used in the implementation of the filter 18. The length of the filter 18, L, is based on the order of the comb filter and decimation rate.

For a $3^{rd}$ order comb filter and varying decimation rates M, the coefficients may be as follows in one embodiment:

```
M = 4:                         1   3   6  10  12  12  10   6   3   1
M = 6:              1   3   6  10  15  21  25  27  27  25  21  15  10   6   3   1
M = 8:                  1   3   6  10  15  21  28  36  42  46  48
                       48  46  42  36  28  21  15  10   6   3   1
M = 16:     1   3   6  10  15  21  28  36  45  55  66  78  91 105 120
                      136 150 162 172 180 186 190 192
           192 190 186 180 172 162 150 136 120 105  91  78  66  55
                       45  36  28  21  15  10   6   3   1
```

A block of input data of K*(M−1)+1 samples is used to compute each output sample. The starting address of the block is determined using the output of a delay calculator. For uniform decimation by M, the block address on the input data advances by M for each output sample. For non-uniform decimation (dynamic receive focusing), the block address may advance by M, M−1, or even less.

Figure 9:
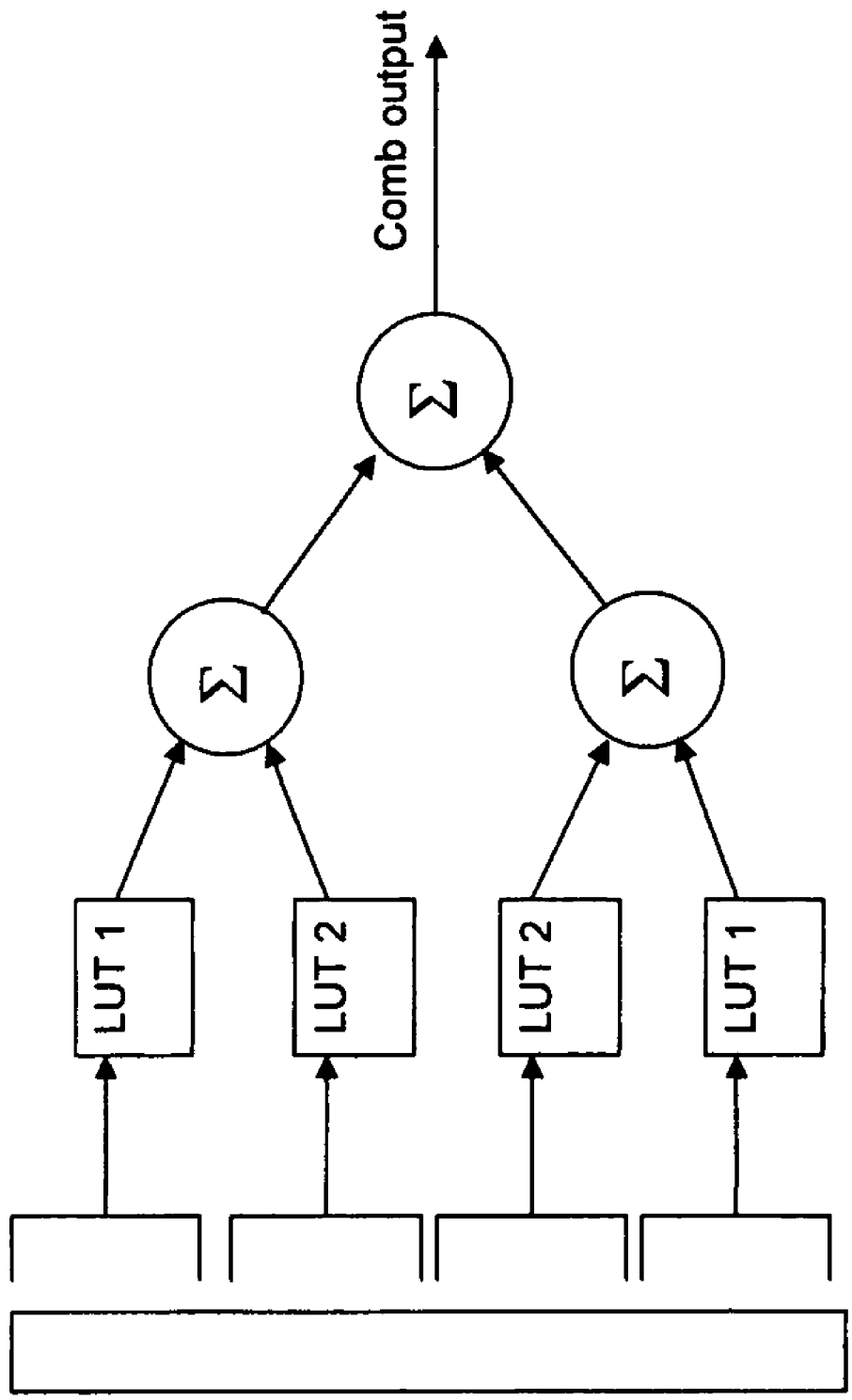

The filter 18 may alternatively be implemented using a look up table (LUT) configuration, such as shown in FIG. 9. Because the coefficients of the comb filter are symmetric, the length of the LUT may be reduced in half. LUT and summation may be combined to minimize hardware complexity. For example, with decimation rate 8 and comb filter length of 22, 2 look-up tables of $2^6$ (64) and $2^5$ (32) entries each, and 3 adders are provided. Alternatively, one LUT of $2^{11}$ (2048) entries and just 1 adder are provided.

Figure 10:
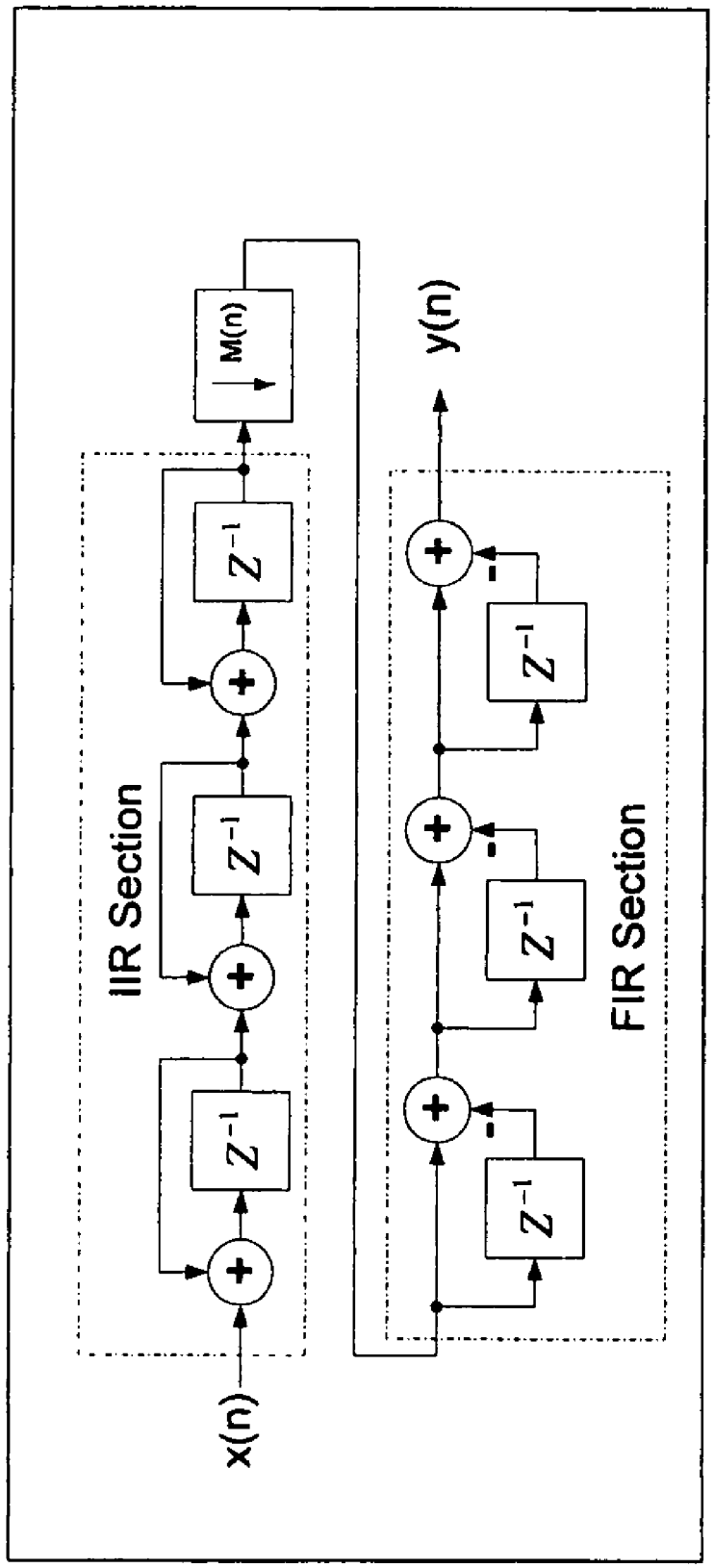

In another alternative approach to the comb filter function, a modified Hogenauer structure shown in FIG. 10 is provided. This filter 18 may provide greater flexibility in choosing a decimation rate with minimal overhead. By breaking the function into two separate parts, some hardware advantages may be gained in the implementation. The function is broken into an IIR section and a FIR section. The IIR section implements the function:

$$H_{IIR}(z) = \left(\frac{z^{-1}}{1-z^{-1}}\right)^k$$

This function is implemented with a cascade of accumulators. After down sampling by M, the signal is passed thru a FIR section, which is described by the function:

$$H_{FIR}(z) = (1-z^{-1})^k$$

The function no longer requires a $z^{-M}$ term because the signal has already been down sampled. In low bandwidth modes, such as CW, the data may be further decimated after the sub-array sum. The large decimation rates are implemented after the sub-array beam sum to make the design more hardware efficient in the communication link to the system.

Figure 11:
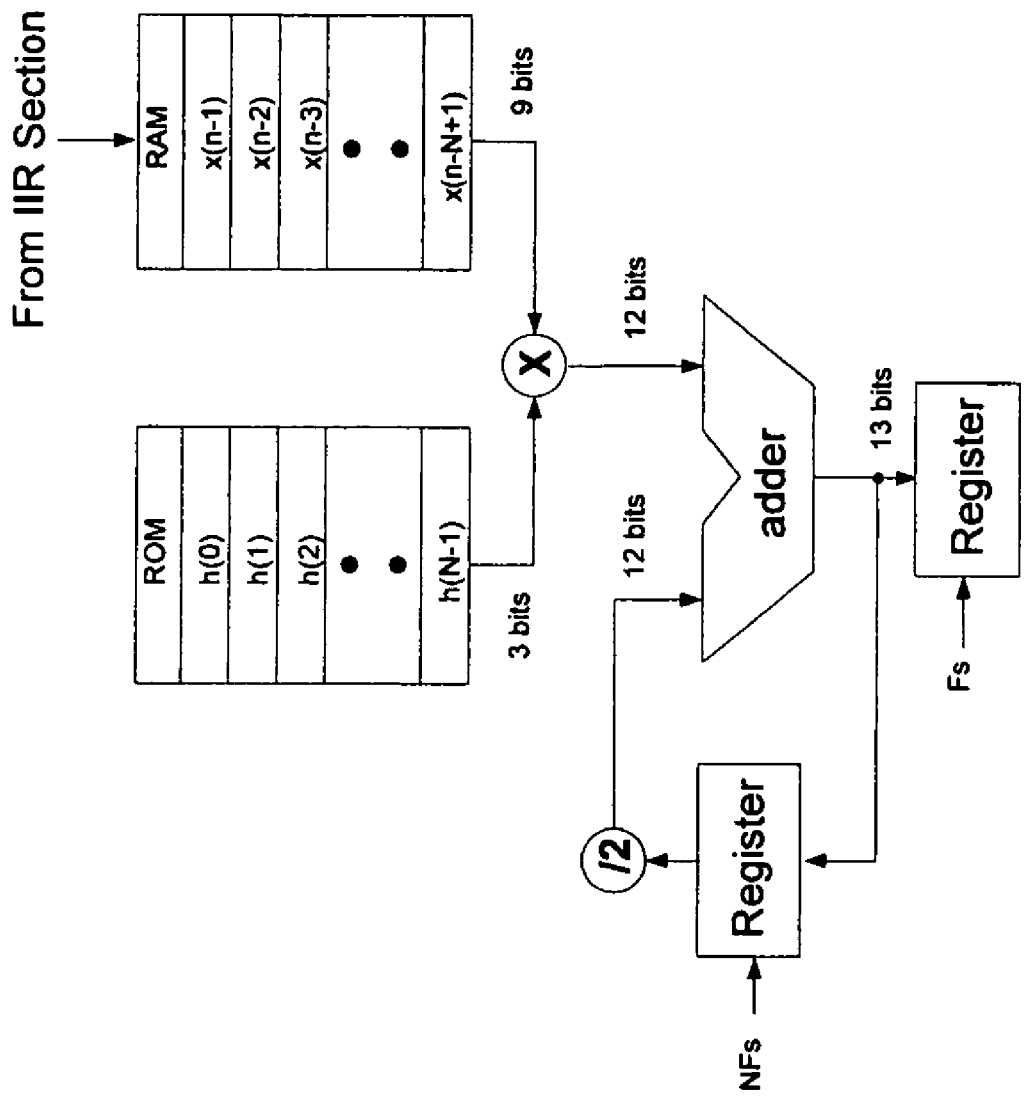

There are several advantages to using the Hogenauer architecture shown. The first is speed. This implementation can work at high speeds because the accumulators have very simple architectures in the IIR section. After decimation (after IIR section), the circuitry no longer requires long delay elements. Less memory is needed. Since the sampling frequency is much lower, a hardware efficient but slower topology could be used, such as that shown in FIG. 11. This topology may handle any value decimation rate as long as the IIR accumulators are constructed with enough bits. In addition, dynamic delays can be applied to the Hogenauer FIR filter section by decimation at non-uniform intervals, reducing dynamic receive beamforming artifacts.

In one example implementation, k is 3, and M is roughly 6. The number of FIR accumulator sections is 3. For a maximum decimation rate of 8, the accumulator sizes vary in the IIR section. A practical and mostly stable implementation may have roughly bit sizes that can accommodate ranges of $\leq (N^k+1)$. The first stage has a range of roughly 3 bits, the second 6 bits, and the third 9 bits for a maximum decimation rate of 16. The ROM and RAM requirements for the FIR section are limited. The filter coefficients have about 2 bits, and the RAM has 6×9 bits per converter. There is an 11 bit adder and two 12 bit registers.

The multiplier 20 is an amplifier, digital processor, digital circuit, filter, or other device operable to amplify or reduce amplitude of the samples output by the filter 18. The multiplier 20 applies apodization to the samples. The apodization applied may vary from channel-to-channel and/or time. In alternative embodiments, a subtractor, divider, adder, or other component implements the apodization weighting.

The phase rotator 22 is a multiplier and adder, mixer, coordinate rotation digital computer (CORDIC) phase rotator, or other phase rotator. The phase rotator 22 is a single component or separate component for acting on the in-phase and quadrature samples. The phase rotator 22 varies the phase of the complex samples represented by the in-phase and quadrature samples. The phasing provides for fine focusing or compensates the lo phase for the applied delays. For radio-frequency embodiments, the phase rotator is not provided. In the CORDIC embodiment and others, an iterative algorithm for calculating trig functions including sine, cosine, magnitude and phase is implemented. The CORDIC may be implemented without any multipliers. The I and Q signals are phase rotated to compensate for LO phase shifts between channels. The phase of a complex number is rotated by multiplying the phase by a succession of constant values. Where the multiplication is by powers of 2, shifts and adds may be usedA binary search is performed by shifting in the +/− direction of the phase until an acceptable resolution is achieved. Repetitive shifts and sums of signed integers implement the shift. A counter or accumulator is used to keep track of the phase until the desired resolution is achieved.

The summer 24 is a node, digital summer, processor, digital circuit, accumulator, or other device for combining digital samples. The summer 24 sums the relatively apodized and focused signals from a plurality of receive beamformer channels. Multiple input arrows are shown for each summer 24 to reflect inputs from the multiple receive channels. The summer 24 is generally a multiple input summer or a cascade of summers each having two or more inputs. The summer 24 is a multiple bit sample summer, such as summing four or six bit samples.

Figure 12:
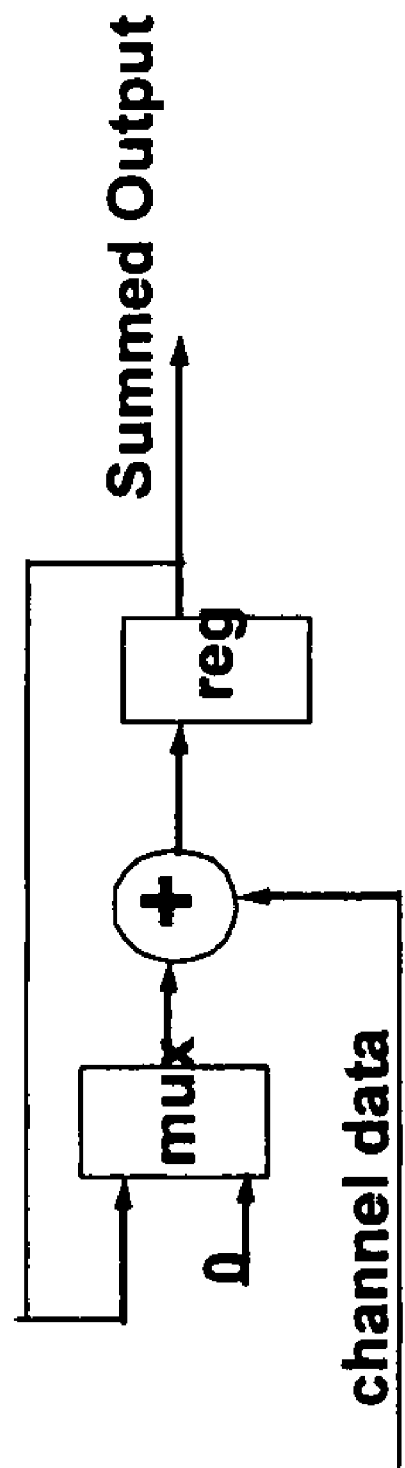
FIG. 12 shows one embodiment of a circuit diagram of a summer for beamformation.
Figure 13:
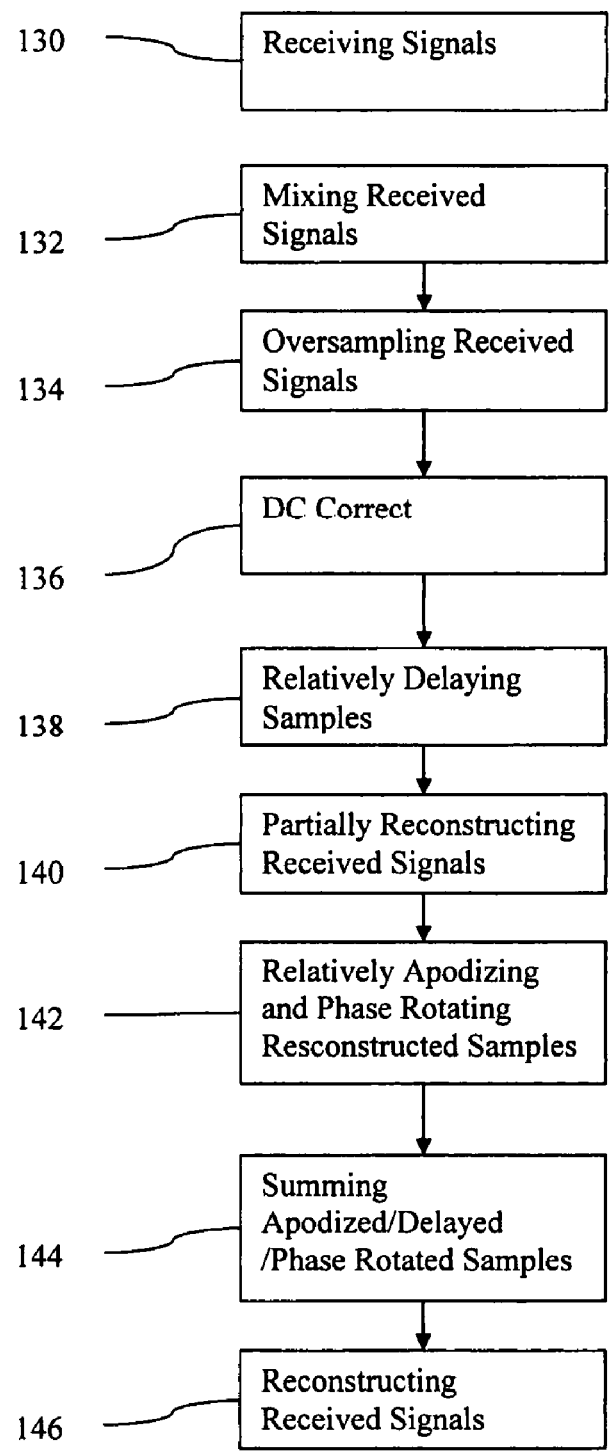
FIG. 13 is a flow chart diagram of one embodiment of a method for receive beamforming with sufficient dynamic range for different ultrasound modes of operation.

FIG. 12 shows one accumulator embodiment of the summer 24. Because the data from the channels have been decimated, the time muxing of data into the summer via an accumulator can readily be achieved at the lower sampled speed. The data from different receive beamformer channels is provided in sequence as channel data. The new channel data is summed with previously accumulated data feed back from the accumulator or register. The multiplexer allows summing with zero. Different numbers of channels may be used for any given sum, so the multiplexer allows control of the summer 24 for the different numbers of channels being used. For multiple beams, the summer is replicated.

The filter 26 is a reconstruction or other circuit operable as a decimation circuit. The filter 26 is a low pass filter operable to construct samples from an output of the summer 24. The filter 26, with the filter 18, reconstructs the samples. Each filter 18, 26 is a partial reconstruction filter. For dynamic receive focusing, a medium-bit-width output is computed by the filter 18 at a decimated rate and at varying sampling intervals controlled by a delay calculator. The summed signal is further filtered using the filter 26 and decimated to produce the beamforming output.

The filter 26 reconstructs the samples. The filter 26 reduces the incoming samples in rate, such as by decimation. Any decimation scale may be used, such as reducing the rate to a half, a quarter, an eighth or more. In one embodiment, the decimation scale is set to provide samples substantially at the Nyquist rate. In alternative embodiments, rates greater than the Nyquist rate may be used. The reconstructed samples are high-bit-width samples reconstructed to the Nyquist or other desired rate. The filter 26 may increase the samples in bit width, such as by combination in filtering. Any increase in bit width may be used, such as changing from two or more bits to eight, ten, twelve, sixteen, or other number of bits per sample. The filter 26 outputs samples with a bit width greater and a rate less than output by the filter 18 and summer 24. Alternatively, the bit width remains the same.

The serializer and encoder 32, and driver 34 provide a communications interface. Other communications interfaces may be used, such as a wireless transceiver, an optical transceiver, a driver 34 without an encoder and/or serializer, or a bus interface. The communications interface is operable to transmit the beamformed samples to a remote imaging system. After beamsumming, the data is formatted for transmission to the system for post processing, such as low pass filtering to remove sigma-delta noise shaping.

In one embodiment, a short distance optical interface is provided, such as an interface with 8b type of encoding. After encoding, a serializer places the samples on a single channel optical link operating at the data rate frequency. The data rate frequency is based on a common clock signal and may be between 100 MHz and 4 GHz, depending on the number of beams, channels and mode. Data for multiple beams or subarrays may be serialized. Any type of signaling may be used, such as CML or LVDS to the optical transceivers. With a short connection to the system, the achievable bandwidth may be 4 or more Gbps, such as 10 Gbps.

In one embodiment, the receive beamformer uses less power than a non-sigma delta digital receive beamformer, such as $\frac{1}{10}^{th}$ the power. Cost may also be less. The use of less power may more likely allow integration of the dynamic digital receive beamformer in a handheld transducer probe. The receive beamformer provides for integrated time-delay based beamforming in a probe head. As integrated circuit feature sizes continue to shrink and operation frequencies rise, sigma-delta conversion may become even more advantageous. All or different modes may be supported by the same receive beamformer. The dynamic range may be sufficient for CW Doppler with a digital beamformer.

Multi-beam processing can be achieved by either time-dimension multiplexing the hardware, replicating the hardware, or both. The beam(s) data is encoded and digitally sent to the ultrasound system via a simple digital interconnect from the handle. Some typical numbers require about 200 Mbps per beam per subarray summer. For 8 beams and 5 subarrays, a 10 Gbps interface is used.

In one embodiment, an integrated clock generator 19 creates the clocks for the mixers 12, the sigma-delta converters 14, logic control for clocked digital implementation, and the communication link 32, 34 to the system. The clock generator could operate from a controlled system clock or be self contained and generate its internal controlled clock via a reference oscillator and phase locked loop (PLL) for example. The phase noise should be sufficiently low to avoid or limit, in all ultrasound modes, clock noise measurable after beam summation. In CW ultrasound mode, the delays are equal within the individual channels (i.e., noise coherently sums for all channels after beam summation). Thus, the clock generator creates a very low phase noise reference with a plurality of clock frequencies for the operation of this embodiment.

More than one beam may be formed at substantially the same time. To form parallel beams in base-band, the circuitry to the right of the memory 16 is operated in a time-multiplexing fashion. The circuit produces output samples for different beams at different times. For example, one, two, or more beam sums are calculated in each repetition of a sequence. Other interleaving of the beamformer may be used. This is possible because the output sample is needed at a decimated rate compared to the input sampling rate.

Different focusing delay and/or apodization profiles are applied to the same received signals. In one embodiment, the beamformer operates in a time-multiplexed manner to form two or more beams from the same received signals. The memory 16 buffers the data to allow selection for delay and other downstream processing from the same data multiple times. The receive beamformer paths are synchronized to sum data for the desired beam at a give time. The channel, summer 24, and filter 26 switch between beams as a function of time.

In alternative embodiments for parallel beamforming, different paths are provided for different beams. The decimation and beamforming circuitry is duplicated, in part. The same memory 16 is used, but different selections of samples from the memory are selected for processing in the different paths. The different selections correspond to different focusing profiles for the different beams. The filters 18 of the different paths tap into the memory 16 at different locations.

FIG. 7 shows one embodiment of a method for receive beamforming ultrasound information. The method is implemented by one of the receive beamformers disclosed herein, such as the receive beamformer of FIG. 1, or a different receive beamformer. The acts are performed in the order shown or a different order. Additional, different, or fewer acts may be provided. For example, act 132 is not provided in a radio frequency implementation.

In act 130, ultrasound information is received. The ultrasound information corresponds to one or more modes. Ultrasound imaging modes include B-mode, harmonic, contrast agent, pulsed wave Doppler, continuous wave Doppler (spectral Doppler)(CW), M-mode, or other now known or later developed modes. More than one mode may be used for imaging at a substantially same time. For example, continuous wave Doppler is used to generate a spectral display adjacent a B-mode image, pulsed wave Doppler image, or both B-mode and pulsed wave Doppler images. The different modes may be used at different times, such as using CW for one patient and a different mode for another patient. The same device may receive ultrasound information pursuant to different modes at different times. For example, receiving continuous wave Doppler and B-mode ultrasound signals in a channel may occur sequentially in rapid succession (substantially simultaneous) in real time imaging for both modes or may occur sequentially with information for one mode separated by minutes, hours, days, weeks, or another period from information for another mode.

The ultrasound information for a given mode may be different than for other modes. For example, PW Doppler information has a narrow bandwidth associated with a range gate, but B-mode information has a wider bandwidth associated with a plurality of locations. The same ultrasound information may be used for different modes, such as using received information for B-mode imaging and as one of a repetition of events for pulsed Doppler imaging. Different or the same waveforms, phasing, frequency, bandwidth, sequences, apodization, line spacing, scan format, or other characteristics may be used for generating receive signals for the different modes.

The ultrasound information is received in one or more channels. For beamforming, the ultrasound information is received in a plurality of receive beamformer channels connected with different elements. Relative delay and apodization profiles are used to generate ultrasound samples representing the acoustic return from spatial locations. By transmitting and receiving along different scan lines, a two or three-dimensional region is scanned. For each receive event, dynamic focusing is applied to the signals received in the beamformer channels.

In act 132, the signals received from a transducer element are mixed. The signals of the currently received ultrasound mode are mixed. The mixing is prior to oversampling. A local oscillation signal is mixed with the received signals to demodulate the signals to base band or an intermediate frequency. More than one mixing stage may be used, such as mixing to an intermediate frequency and then mixing to base band. By mixing with the local oscillation signal in two paths, ninety degrees out of phase, phase information is maintained by forming in-phase and quadrature signals. In alternative embodiments, mixing is provided after oversampling.

In act 134, the received signals in each channel are over sampled. The ultrasound signals of the currently received ultrasound mode or modes are converterted. Where the received signals are split into in-phase and quadrature signals, both paths are separately oversampled. In one embodiment, sigma-delta analog-to-digital converters oversample. The oversampling converts the received signals into digital samples. Any oversampling ratio may be provided. For example, the ratio of sampling rate to Nyquist rate is at least 10. Other rates may be used, such as a rate in the range of 10-200. The silicon or other semiconductor speed, such as 200 MHz-1 GHz, may limit the upper capability for the oversampling ratio. As speeds increase, other oversampling ratios may be possible. The rate is fixed, programmable, or varies.

In act 136, the over sampling is corrected for DC offsets. A DC component is removed when the receiver has no signal at the input. The DC offset in the samples output by the sigma-delta converter is determined by averaging, accumulation, or integration. An inverse of the offset is added or the offset is subtracted from signals input to the sigma-delta converter. The feedback around the sigma-delta converter is used to correct the DC offset. DC offsets may be removed by high pass filtering. Alternatively, the DC component is not separately removed.

The offset is calculated in an on-going manner. Alternatively, the offset is calculated periodically and held constant in-between calculations. For example, the offset is determined prior to each receive event and held constant during receiving in order to avoid errors due to depth gain control.

The samples output by the over sampling are used for beamforming. The ultrasound signals of the currently received mode are beamformed. Signals from different modes are beamformed at different times or in parallel. Acts 138, 142, and 144 correspond to beamforming, but beamforming may be provided without one or more of these acts, such as without acts 138 and/or 142.

In act 138, the over sampled signals are relatively delayed. A same or different delay is provided for each channel. The focusing profile for steering the beam and determining a focal region dynamically along the beam indicates the desired delay for a given channel. Two or more channels may have a same delay. Since the oversampled signals are provided as a function of time, the samples to be used for a given range are selected as a function of the delay. Earlier or later occurring samples are selected. A buffer or other memory may be used to provide for selecting based on the delay. Any number of samples may be selected for a given delay, such as tens or hundreds.

In one embodiment, the delay determines the entire focus. In other embodiments, the delay corresponds to a coarse focus and phase rotations provide fine focus. For example, phase rotation is applied after the relative delaying and before summation.

Different samples are selected for different depths. The focusing profile varies as a function of depth (time). By applying different delays, different samples are selected. The sample window for one delay may or may not overlap with sample windows for delays applied at other times.

In act 140, the selected samples are partially reconstructed. Partial refers to the reconstruction to a lower rate still oversampled relative to the Nyquist rate. The reconstruction is performed by filtering and/or decimating. The filtering may provide for decimating. Filtering combines information. By combining information, a lesser number of samples may be output. Any decimation rate may be provided, such as by a factor of three or more but less than the oversampling ratio of the converters. Finite or infinite impulse response filtering may be used. Since one filter is provided for each channel, to support a large number of channels on a device, the filter may be kept as simple and compact as possible. For example, the comb filter structure is used. More complex filters may be provided.

The reconstruction may provide for samples with a higher bit width. For example, the selected samples are single bits. The partial reconstruction results in two or more, such as 4-8 or 6 bits per sample. In alternative embodiments, the bit width does not change.

In act 142, the reconstructed samples are relatively apodized. The apodization profile across channels contributes to the desired beam profile, such as by reducing side lobes. The apodization profile sets a relative amplitude or contribution of each channel to the beam sum. Apodization is implemented by increasing or decreasing the amplitudes of the reconstructed samples. The apodization function varies with time or depth. The increase or decrease is performed using any function, such as addition, subtraction, multiplication, or division. For example, a deviation from unity associated with the apodization for a given channel is obtained by digital multiplication by a weight.

In act 144, the relatively focused and apodized samples are summed. The samples from the different channels are summed. All the samples are summed together with a multi-input summer, sequential summation is performed with cascaded summers, or combinations thereof are performed. The summation is performed at a data rate less than output by the initial oversampling and greater than the Nyquist rate or other rate above the Nyquist rate.

By summing focused samples from the different channels, such as sixty four or more channels, a beam sum is formed. The beam sum represents the acoustic reflection at the focal region along the scan line. By changing the focal profile as a function of time, samples representing different depths along a scan line are formed.

In act 146, the beam sum samples are reconstructed. The reconstruction reduces the data rate associated with the beam sum samples and/or increases the bit width. For example, filtering and decimation are performed. The beam sum samples are combined to reduce the data rate and increase the bit width. The bit width is increased to minimize loss of information. For example, 4 or 6 bit width samples of each beam sum are reconstructed to 8, 12, or 16 bit width samples. Any number of bit widths may be used, including maintaining a same bit width. The decimation may be by any factor, such as by one or more. In one embodiment, the decimation reduces the data rate substantially to the Nyquist sampling rate or other rate higher than the Nyquist rate.

The reduction in rate may result in an apparent loss of resolution. Fewer samples are provided along a scan line. Since the samples are at or above the Nyquist rate, sufficient samples for imaging are provided.

The same system and method may operate with different modes. For example, the same digital beamformer is operable with B-mode and CW mode, allowing one receive beamformer without a separate analog receive beamformer for CW and/or PW Doppler imaging.

The same device and method may be used with different sized transducer elements. By combining or not combining sigma-delta converter paths or receive channels, the dynamic range may be better matched to the elements of a given transducer. For a larger element with lower impedance, sigma delta data from several paths is summed and re-modulated into a single bit stream as a receive beamformer channel. The multiple paths provide for larger dynamic range and minimal loss of information.

The selection of a number of converter paths to use for a given receive beamformer channel is performed prior to the delay memory 16 (see FIG. 1). By selecting multiple paths for each receive beamformer channel, the number of receive beamformer channels available for beamforming is reduced. Sub-array beamforming may be used. The sub-array beamformed information is further beamformed by the imaging system.

The selection of paths for each beamformer channel makes the electronics universal across the possible probes. The beamformer system scales to any size element with arbitrary delay requirements. Common hardware architecture across applications and associated transducers may be provided at a minimal cost as compared to separate hardware.

Hand held ultrasound imaging systems may require large channel delays and full beam formation since there is no system beamformer. Cart, or larger portable system may provide additional beamforming capability, so the receive beamforming provided elsewhere may be only sub-array beamforming but may be full beamforming.

Figure 14:
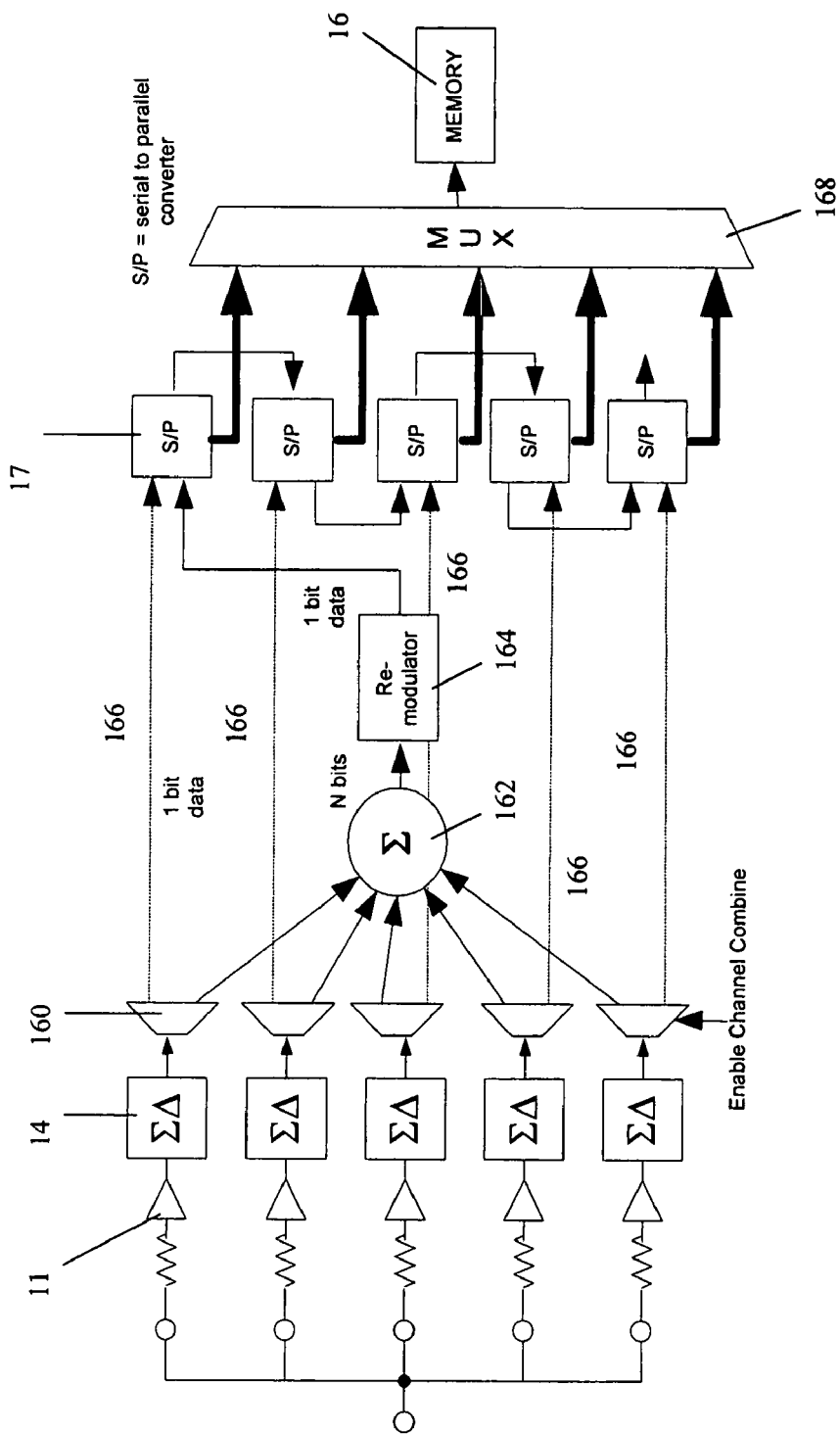
FIG. 14 is a block diagram of one embodiment of a receiver system for connection with different sized transducer elements.
Figure 15:
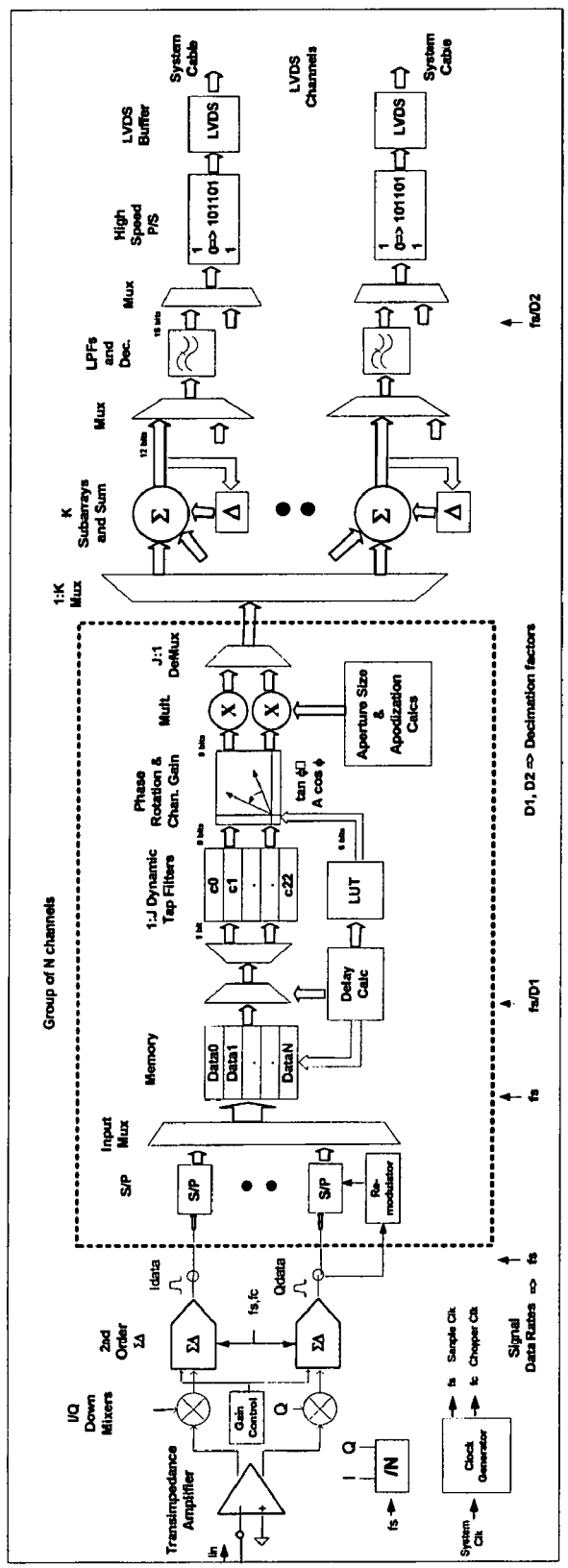
FIG. 15 is a block diagram of one embodiment of the receiver system of FIG. 14 implemented with the receive beamformer of FIG. 1.

FIG. 14 shows one embodiment of a receiver for ultrasound information. The receiver has components inserted between the converters 14 and the serial-to-parallel converter 17 and delay memory 16 of FIG. 1. FIG. 15 shows the the inserted components for one path. Referring again to FIG. 14, switches 160, a summer 162, and a re-modulator 164 are provided. Additional, different, or fewer components may be inserted. In alternative embodiments, a larger memory and active reconstruction filtering is provided for connection with different sized elements.

The components shown in FIG. 14 and/or 15 are integrated on one chip. For example, the sigma-delta analog-to-digital converters 14, the summer 162, the conductors 166, and the switches 160 are in an integrated circuit. Other modules or groupings of the same components are provided in the same integrated circuit or chip. Additional chips or integrated circuits may be provided for expansion.

Each chip, integrated circuit, or circuit has input connectors. The input connectors connect with different ones of the paths (i.e., converters 14). A board, via, trace, or other wiring with the transducer connects the elements to the input connectors. Transducers with smaller elements, such as two-dimensional arrays of hundreds or thousands of elements, may connect each element to each paths and corresponding input connector. Transducers with larger elements, such as one-dimensional arrays with tens or hundreds of elements, may connect each element to a multiple paths and corresponding input connectors. The routing of elements to input connectors is hardwired or programmable (e.g., multiplexed). The transducer board with the routing is fixedly or releasably connected with the input connectors. In one embodiment, the input connectors are integrated circuit traces with the element and receiver channels on a same chip.

Referring to the embodiment of FIG. 14, the low noise amplifiers 11 are operable to connect in parallel with other amplifiers. For transducer arrays with smaller elements, the inputs of the desired number of converter paths connect to a same element, connecting the amplifiers 11 of the grouped paths in parallel. The grouped amplifiers 11 act as a single input amplifier but with as many outputs as there are amplifiers 11 connected in parallel. The mixers 12 are before or after the amplifiers 11. For simplicity, FIG. 14 is shown without the mixers 12 and associated I/Q separation.

The outputs of the sigma-delta converters 14 are either connected to (a) the serial-to-parallel converter 166 to interface to the delay memory 16 through the multiplexer 168 or (b) the summer 162 whose output is the summation of the parallel paths. The switches 160 select the output connection. The switches 160 are multiplexers, transistors, relays, or other now known or later developed switching devices. Where the paths operate independently, the connection (a) above is used with each path operating as a receive beamformer channel. Where the paths are used together, the connection (b) above is used with the grouped paths together operating as a receive beamformer path. Other groupings are provided for other receive beamformer paths. In one embodiment, the groupings are limited by the connections between paths and the summers 162 available. In alternative embodiments, multiplexing and a plurality of summers 162 may reduce a number of paths not used, allowing the circuitry to switch between a range of numbers of receive beamformer paths.

The selection between connections (a) and (b) is a function of the currently connected transducer array and/or the impedance of the connected elements. For releasable transducers, a memory in the transducer may identify the transducer. Based on the identification, the switches 160 are configured. Alternatively, only one type of array is connectable or one array is fixed in the system. The switches 160 are programmed based on the construction used.

For the connection (a), the conductors 166 bypass the summer 162 with the ultrasound information from the sigma-delta analog-to-digital converters 14. The conductors 166 are traces, wires, or other conductors for communicating the samples from the converters 14 to the delay memory 16.

For the connection (b), the output of the sigma-delta converters 14 is provided to the summer 162. The summer 162 is a digital adder. Cascaded, accumulated, or other summing may be provided. The summer 162 is the same or different type of summer as the beamformer summer 24. By summing samples, the summer 162 outputs samples with a higher bit width. For example, the summer 162 sums one-bit samples from five converters 14. The result is a three-bit sample.

The re-modulator 164 is operable to convert the multiple-bit samples to samples with a fewer number of bits, such as one-bit samples. Any now known or later developed re-modulator may be used, such as a digital sigma-delta, a digital pulse width modulator, or a thresholding limiter.

The serial-to-parallel converter 17 connects with the conductors 166 and the summer 162 through the re-modulator 164. If data is provided from the re-modulator 164, the serial-to-parallel converter 17 is configured in series since a single data stream is provided for the memory 16. Other configurations may be used, such as where multiple re-modulators 164 input to a same memory 16. For receiving parallel data streams from the different sigma-delta converters 14, the serial-to-parallel converter 17 operates the separate converter components in parallel into the multiplexer 168.

The memory 16 receives the data from the receive beamformer channel or channels, such as from the summer 162 or the sigma-delta converters 14. The memory 16 is shared by two or more receive beamformer channels. Since the memory 16 is shared among a predetermined maximum number of receiver channels, the amount of overhead to repartition the serial-to-parallel converters 17 is minimized.

Using the switchable paths, the same circuit may be configured to meet any delay requirements for a given probe. The memory 16 implements the delay as discussed above for FIG. 1. Similarly, the summer 24 completes the beamformation from the samples provided for different receive beamformer channels.

Each receive beamformer channel is one or more of the receiver channels. Each receiver channel includes a single one of the sigma-delta analog-to-digital converters 14. The switches 160 select the conductors 166, such as for connection to a one-dimensional array of transducer elements, or select multiple receive channels to form one receive beamformer channel, such as for connection to a two-dimensional array of transducer elements.

The receiver channels or paths shown in FIG. 14 or other arrangements may be used for receiving ultrasound information from different sized or impedance transducer elements. The plurality of sigma-delta analog-to-digital conversion paths is used separately as receive beamformer channels for connection with high impedance elements. The outputs of the paths within different groups are summed together for connection with low impedance elements. Each grouping is a receive beamformer channel.

For grouping, the sum may be re-modulated to a fewer number of bits. The re-modulation allows a same hardware (e.g., serial-to-parallel converter 17) to interface with the delay memory 16. The re-modulation reduces each sample to samples with a fewer number of bits. The bit width of samples from the conductors 166 and the re-modulator 164 are the same, but may be different in alternative embodiments.

The samples stored in the memory 16 are delayed and summed. The samples from different receive beamformers are relatively delayed and summed together as a sub-array or complete beamsum.

While the invention has been described above by reference to various embodiments, it should be understood that many changes and modifications can be made without departing from the scope of the invention. As used herein, "connected with" includes direct or indirect connection. For example, one or more hardware or software components may be between two connected components.

It is therefore intended that the foregoing detailed description be regarded as illustrative rather than limiting, and that it be understood that it is the following claims, including all equivalents, that are intended to define the spirit and scope of this invention.

We claim:

1. In a receive beamformer system for ultrasound information, an improvement comprising:
    a first receive beamformer channel comprising a sigma-delta analog-to-digital converter, the first receive beamformer channel operable for both continuous wave Doppler and pulsed B-mode signals;
    wherein the continuous wave Doppler signals have a bandwidth less than 50 KHz and the B-mode signals have a bandwidth greater than 50 KHz, and wherein the sigma-delta analog-to-digital converter is operable at an oversampling ratio corresponding to a dynamic range of the continuous wave Doppler signals greater than 70 dB and a dynamic range of the B-mode signals greater than 60 dB.

2. The improvement of claim 1 wherein the sigma-delta analog-to-digital converter is at least a second order converter.

3. The improvement of claim 1 wherein the sigma-delta analog-to-digital converter is a single bit converter.

4. The improvement of claim 1 wherein the first receive beamformer channel further comprises a mixer operable to down convert an input signal to base band, the down converted signal being input to the sigma-delta analog-to-digital converter.

5. The improvement of claim 1 wherein the sigma-delta analog-to-digital converter is operable at an oversampling ratio of at least 10.

6. In a receive beamformer system for ultrasound information, an improvement comprising:
a first receive beamformer channel comprising a sigma-delta analog-to-digital converter, the first receive beamformer channel operable for both continuous wave Doppler and pulsed B-mode signals;
wherein the first receive beamformer channel further comprises a DC correction feedback circuit from an output of the sigma-delta analog-to-digital converter to an input of the sigma-delta analog-to-digital converter; and
wherein the DC correction feedback circuit is operable to update a DC correction value output to the input of the sigma-delta analog-to-digital converter between receive cycles.

7. In a receive beamformer system for ultrasound information, an improvement comprising:
a first receive beamformer channel comprising a sigma-delta analog-to-digital converter, the first receive beamformer channel operable for both continuous wave Doppler and pulsed B-mode signals;
wherein the first receive beamformer channel further comprises a first filter operable to construct first samples with a greater bit width than output from the converter; and
further comprising:
at least a second receive beamformer charnel;
a summer operable to sum outputs from the first and second receive beamformer channels;
a second filter operable to construct second samples from an output of the summer, the second samples having a greater bit width than the first samples; and
a communications interface operable to transmit the second samples to a remote imaging system.

8. A method for receive beamforming ultrasound information, the method comprising:
receiving continuous wave Doppler and B-mode ultrasound signals in a first channel;
converting the continuous wave Doppler and B-mode ultrasound signals in the first channel from analog-to-digital by oversampling; and
beamforming from the converted continuous wave Doppler and B-mode ultrasound signals;
wherein the continuous wave Doppler ultrasound signals have a bandwidth less than 50 KHz and the B-mode ultrasound signals have a bandwidth greater than 50 KHz, and wherein the sigma-delta analog-to-digital converter is operable at an oversampling ratio corresponding to a dynamic range of the continuous wave Doppler ultrasound signals greater than 70 dB and a dynamic range of the B-mode ultrasound signals greater than 60 dB.

9. The method of claim 8 wherein receiving, converting and beamforming are performed at different times using the same hardware of the first channel for the continuous wave Doppler and B-mode ultrasound signals.

10. The method of claim 8 wherein converting comprises converting with an at least a second order converter.

11. The method of claim 8 further comprising:
mixing the continuous wave Doppler and B-mode ultrasound signals to in-phase and quadrature base band information prior to converting.

12. The method of claim 8 further comprising:
removing a DC component in a feedback around a sigma-delta converter.

13. The method of claim 8 wherein converting comprises oversampling by an oversampling ratio of at least 10.

14. A receiver system for ultrasound information, the receive beamformer system comprising:
a plurality of a sigma-delta analog-to-digital converters;
a first summer operable to combine the ultrasound information from the sigma-delta analog-to-digital converters;
conductors operable to bypass the first summer with the ultrasound information from the sigma-delta analog-to-digital converters; and
switches operable to select between the first summer and the conductors as a function of element impedance.

15. The receiver system of claim 14 further comprising:
a delay memory connected with an output of the summer and the conductors; and
a second summer operable to sum the ultrasound information from a plurality of receive channels.

16. The receiver system of claim 15 wherein each receive channel of the plurality of receive channels comprises a single one of the sigma-delta analog-to-digital converters with the switches selecting the conductors as a function of connection to a one-dimensional array of transducer elements, and wherein each receive channel of the plurality of receive channels comprises a plurality of the sigma-delta analog-to-digital converters with the switches selecting the first summer as a function of connection to a two-dimensional array of transducer elements.

17. The receiver system of claim 14 wherein the first summer outputs multiple-bit samples;
further comprising:
a re-modulator operable to convert the multiple-bit samples to samples with a fewer number of bits.

18. The receiver system of claim 14 further comprising:
a serial-to-parallel converter connected with the conductors; and
a delay memory connected with the serial-to-parallel converter;
wherein the serial-to-parallel convener connects with the first summer.

19. The receiver system of claim 14 wherein the sigma-delta analog-to-digital converters, the summer, the conductors, and the switches are in an integrated circuit, and further comprising:
connectors with inputs to the integrated circuit, multiple of the connectors connected with a same element for a multi-dimensional transducer array and connected with separate elements for a one-dimensional transducer array.

20. A method for receiving ultrasound information from different sized transducer elements, the method comprising:
providing a plurality of sigma-delta analog-to-digital conversion paths;
using the paths separately as receive beamformer channels for connection with first transducer elements; and
summing the ultrasound information from multiple ones of the paths as a receive beamformer channel for connection with a second transducer element, the second transducer element having a lower impedance than one of the first transducer element.

21. The method of claim 20 further comprising:
re-modulating an output of the summing to samples having a fewer number of bits.

22. The method of claim 20 further comprising:
delaying the ultrasound information in each of the receive beamformer channels; and
summing the ultrasound information from a plurality of the receive beamformer channels.

* * * * *